`US011571628B2`

(12) United States Patent
Dorn et al.

(10) Patent No.: US 11,571,628 B2
(45) Date of Patent: Feb. 7, 2023

(54) MODIFYING GAME CONTENT TO REDUCE ABUSER ACTIONS TOWARD OTHER USERS

(71) Applicant: Sony Interactive Entertainment LLC, San Mateo, CA (US)

(72) Inventors: Victoria Dorn, San Mateo, CA (US); Tomoyo Kimura, San Mateo, CA (US); Regina Huricks-Trapp, San Mateo, CA (US); Jing Li, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/034,931

(22) Filed: Sep. 28, 2020

(65) Prior Publication Data
US 2022/0096937 A1 Mar. 31, 2022

(51) Int. Cl.
| A63F 13/00 | (2014.01) |
| A63F 13/79 | (2014.01) |
| A63F 13/53 | (2014.01) |
| A63F 13/69 | (2014.01) |

(52) U.S. Cl.
CPC .............. *A63F 13/79* (2014.09); *A63F 13/53* (2014.09); *A63F 13/69* (2014.09)

(58) Field of Classification Search
CPC ........... A63F 13/67; A63F 13/79; A63F 13/75
See application file for complete search history.

(56) References Cited

U.S. PATENT DOCUMENTS

| 10,115,124 | B1* | 10/2018 | Kamvysselis | ...... G06Q 30/0244 |
| 2003/0216181 | A1 | 11/2003 | Danieli et al. | |
| 2006/0025214 | A1 | 2/2006 | Smith | |
| 2008/0182660 | A1* | 7/2008 | Fulton | .................. G06F 21/316 |
| | | | | 463/29 |
| 2009/0111583 | A1* | 4/2009 | Zalewski | .............. A63F 13/497 |
| | | | | 463/42 |
| 2011/0083086 | A1 | 4/2011 | Brownlow et al. | |
| 2019/0052471 | A1 | 2/2019 | Panattoni et al. | |
| 2019/0160382 | A1 | 5/2019 | Miyaki | |
| 2019/0314728 | A1 | 10/2019 | Sullivan et al. | |
| 2020/0197810 | A1 | 6/2020 | Kung et al. | |

OTHER PUBLICATIONS

Intl Search Report PCT/US2021/050536, dated Jan. 5, 2022, 4 pages.

\* cited by examiner

*Primary Examiner* — David L Lewis
*Assistant Examiner* — Eric M Thomas
(74) *Attorney, Agent, or Firm* — Penilla IP, APC

(57) ABSTRACT

Methods and systems for modifying game content include providing content of a video game to a first user. A request is received from a second user for accessing the video game. Responsive to the request, behavior of the first user is determined and content representing the second user is modified to hide the identity of the second user. The modified content representing the second user is included with content of the video game presented to the first user, and the unmodified content representing the second user is included with content of the video game presented to the second user.

30 Claims, 15 Drawing Sheets

MODIFYING GAME CONTENT TO REDUCE ABUSER ACTIONS TOWARD OTHER USERS

TECHNICAL FIELD

The present disclosure relates to monitoring behavior of players during game play of video games, and adjusting content of the video game to reduce abusive activity in the video game.

BACKGROUND OF THE DISCLOSURE

Interactive applications, such as video games, virtual life simulations, educational applications, music applications, etc., have gained popularity in recent years. The vast majority of the video games are streaming three dimensional (3D) video games (also called massively multiplayer online games—MMOG). The MMOG are simultaneously accessed by a large number of users by connecting over a network, such as the Internet. A user of a MMOG application assumes a role of a virtual character or a game icon within the video game and controls action of the virtual characters or the game icon using inputs provided via input devices, such as keyboards, game controllers, touch screens, etc. Through the inputs, the user can navigate virtual space and interact with a gaming environment and with virtual characters/game icons of other users in accordance to game rules and objectives specified for the video game. Based on the game rules and objectives, the inputs provided by the user may be in collaboration with other users (e.g., as part of a team) to achieve a shared goal or may be in competition with other users to progress in the video game.

Instead of assuming a role within the video game, the user may assume a role of a spectator or a commentator (e.g., influencer) providing comments (e.g., audio, video and/or text comments, chats) related to a player or another spectator or about game play content of the video game.

The input provided by the user in a gaming scenario of the video game is interpreted to perform a certain action in the gaming environment. Most of the times, the action of a user is in accordance to game objectives defined for the game and may be directed toward a specific game asset in order for the user to gain points or advance in the game. However, sometimes the user (e.g., a first user) may provide input to cause the game play to stop prematurely, or sacrifice their game character (i.e., cause the game character's "death") purposefully, or prevent or obstruct a second user in the gaming scenario from advancing in the game, or simply harass the second user, wherein the harassing of the second user may be in the form of directing certain actions (e.g., throwing objects) repeatedly at the game character of the second user. Alternatively, the first user may provide inputs via interaction interface rendered alongside gaming scenario of the game and may direct the input toward the second user. For example, the input may be a demeaning comment directed at the second user. The first user may be a player or a spectator or an influencer and the input provided via the interaction interface and targeting the second user may be provided in the form of audio, video, chat or textual content. The second user may be a player or a spectator. Such inputs of the first user may be deemed as harassing or intimidating, especially when the inputs are not in accordance to the game mechanics of the game and are generated every time the first user detects the presence of the second user either in the gaming scenario or in the interaction interface. Depending on the intensity of the inputs and/or actions of the first user, the second user may feel that they are being cyber bullied and may resort to completely avoiding the game for fear of encountering the first user. Consequently, for the second user that is being stalked or bullied by the first user, the game has less entertainment value leading to the second user turning away from the game. As more and more users start taking this action of avoiding the game due to behavior of a few users, the popularity and interest in the game gets adversely affected.

This is against the intentions of the game developer as the intentions of the game developer are to ensure that every user has a satisfying and pleasant game play experience. Cyber bullying is a pervasive problem that needs to be addressed in order to attract users to the game and to keep them engaged for an extended period of time.

It is in this context that embodiments of the disclosure arise.

SUMMARY

Embodiments of the present disclosure relate to systems and methods for determining behavior of a user of a video game and to dynamically adjust content related to the video game presented to different users. For all intents and purposes, the user may be a player who is actively involved in playing the game by providing game inputs, or may be a spectator who is watching the game play and/or providing comments, or may be an influencer actively providing comments on the game play of one or more players of the game or promoting the game. Some implementations are described with reference to the user being a player, but can also be extended to a user who is a spectator viewing or influencer providing comments in relation to game play of one or more players.

The video game may be a single player game or a multi-player game (e.g., MMO game) with a plurality of players accessing the video game from different geolocations and providing game inputs during game play. In case of both the single player game and MMO game, the game play of the game may be watched by a plurality of spectators and/or influencers. Various game assets (i.e., game items or sometimes simply referred to as "items") are identified in a gaming scenario of the game. The game assets in the gaming scenario include game objects and one or more game character(s) or avatar(s) representing or associated with one or more players. The game content is updated with inputs from the one or more players and streamed as game play data to client devices of one or more players, one or more spectators and/or one or more influencers. In addition to streaming game content, an interactive interface may also be rendered alongside the game content. The interactive interface may be used to provide inputs in the form of audio, video, chat, or textual comments related to the game play of the game, related to one or more player(s), or related to one or more spectator(s) of the video game. Inputs provided by a player within the game are used to perform certain actions within the game. The action influences a game state of the game. The game content identifying current game state of the game is provided for rendering on client devices of the player and of other users who may be players or spectators or influencers of the game. Alternately, input provided by the user may include comments provided via the interactive interface that are shared with other users, wherein the user may be a player or a spectator and the other users may be players or spectators or influencers.

A first user may access the video game for a current game play session. In response to the first user accessing the video game, content of the video game including game content and other interactive content, such as chats, videos, emojis, text, audio, etc., are provided to the client device of the first user for rendering. The first user may be a player or a spectator and the interactive content may be provided by other users who may be players, spectators or influencers. When a second user requests access to the video game during the current game play session, the input of the first user provided during previous game play session of the video game is evaluated in the context of the video game to determine if the input of the first user was directed toward the second user and was deemed abusive toward the second user. The second user may be a player or a spectator and the input of the first user may be a comment directed toward the second user and provided via interactive interface or an in-game action directed toward a game character of the second user. The input provided within the game play of the game may be considered abusive if the input is not in accordance to game objective and is provided to prevent or obstruct the second user from advancing in the game, or is provided to damage the game assets of the second user or kill a game character of the second user. Similarly, the input provided outside of the game and via an interactive interface may be evaluated to determine if the input targeted the second user and included language that is intimidating or inappropriate or rude or otherwise deemed harassing in nature.

When it is determined that the first user's input is targeting the second user and is abusive in nature, the representation of the second user included in the content presented to the first user is dynamically modified to hide the identity of the second user. Hiding the identity of the second user deters the abuser (i.e., the first user) as the first user is unable to recognize the abusee (i.e., the second user) in the content related to the game presented at the client device of the first user, thereby deterring the abuse of the second user. Masking the identity of the second user ensures that the second user can participate in the game without fear of being recognized by the first user and be abused. This allows the second user to have a satisfying game play experience without fear of being recognized by the abuser and abused. Satisfied user experience relates to longer user engagement at the game cloud system, which can relate to greater revenue for the game hosting sites/systems.

Masking the representation of the second user is performed selectively, in that the content presented to the first user includes the masked representation of the second user while the content presented to the second user includes the original representation of the second user. The original representation of the second user reveals the identity of the second user. In addition to modifying the representation of the second user, the game mechanics of the game is also modified to recognize the masked representation of the second user as well as the original representation of the second user so that actions generated by the second user in the game or in the interactive interface are recognized and used to appropriately provide updates of the game content or interactive content to the different users of the video game.

In one implementation, a method for adjusting content of a video game is disclosed. The method includes providing content of the video game from a current game play session for rendering on a client device of a first user, in response to the first user accessing the video game. A request to access the video game during the current game play session is detected from a second user. In response to detecting the request from the second user, a behavior of the first user is determined by analyzing inputs of the first user from one or more prior game play sessions of the video game. When the behavior of the first user is determined to be abusive toward the second user, a modified representation of the second user is dynamically selected for including in the content of the video game forwarded to the client device of the first user for rendering. The modified representation of the second user hides an identity of the second user to the first user during the current game play session.

In one implementation, the modified representation of the second user inherits select ones of the user attributes of an original representation of the second user. The select ones of the user attributes inherited are relevant to mimic a behavior of the original representation of the second user within a gaming scenario of the video game. The select ones of the user attributes includes at least physics attributes pertaining to game play of the video game.

In one implementation, an alternate game character and an alternate user identifier are identified for associating with the second user. The alternate game character and the alternate user identifier are specific to the second user and are in addition to a game character and user identifier associated with the second user. The alternate game character of the second user is included within gaming scenario of the video game forwarded with the content of the video game to the client device of the first user. The alternate game character is associated with the alternate user identifier in the video game. The game character of the second user is included within the gaming scenario of the video game forwarded with the content to a client device of the second user. The game character is associated with the user identifier and the game character of the second user reveals the identity of the second user.

In some implementations, modifying the representation of the second user includes modifying at least the graphic representation and the user identifier of the second user to generate modified graphic representation and modified user identifier of the second user. The modified graphic representation and the modified user identifier are associated with the second user and are configured to mask the identity of the second user, the graphic representation and the user identifier reveal the identity of the second user.

In one implementation, the other users are spectators or players of the video game.

In one implementation, the game mechanics of the video game are modified to generate modified game mechanics. The modified game mechanics is configured to recognize the modified representation and an original representation of the second user, such that the game inputs provided by the second user during game play are processed by the modified game mechanics to generate content for the video game. The generated content forwarded with the modified representation of the second user to a client device of the first user for rendering and with the original representation of the second user to a client device of the second user.

In some implementations, the first user and the second user are players in the video game.

In some implementations, the first user is a spectator and the second user is a player.

In some implementations, the first user and the second user are spectators.

In some implementations, a modified game character of the first user is generated and included with content of the video game forwarded to a client device of the second user. The modified game character of the first user masks a identity of the first user to the second user.

In some implementations, the content related to the video game includes game play data, and any one or combination of video content, textual content, chat content, or audio content, wherein the video, textual, chat or audio content are generated by players or spectators of the video game. The input of the first user includes any one or combination of the video content, textual content, audio content or chat content, and the input of the first user is contextually analyzed.

In some implementations, when the input of the first user includes audio or text or chat content, modifying the content includes dynamically filtering the audio or text or chat content using a content filter to generate modified content. The content filter is used to identify a certain keyword that is included in the audio, text or chat content that is perceived as offensive or inappropriate by the second user and replacing the certain keyword with a different keyword that is acceptable to the second user. The different keyword selected is specific for the second user and is identified using the content filter. The audio, the text or the chat content without the dynamic filtering is presented with content of the video game on a firsts client device of the first user for rendering and the modified content with the dynamic filtering of the audio, the text or the chat content are provided for rendering on a second client device associated with the second user.

In some implementations, the content filter for filtering the content is selected from a plurality of content filters available for the second user. The plurality of content filters is identified based on user profile of the second user and the video game. The selected content filter is specific for the second user and for the video game.

In some implementations, when the input of the first user includes chat content, a volume of chat content generated by the first user is dynamically throttled upon detecting the volume exceeds a predefined threshold volume. The predefined threshold volume is defined for the video game and is specified for each user generating the chat content.

In some implementations, the throttling of the volume is based on context of the video game and user profile of the first user.

In some implementations, when the input of the first user includes audio, text or chat content, translating the audio, text or chat content from a first language to a second language preferred by the second user. The second language preference obtained from a user profile of the second user. The translating further includes dynamically filtering the input using a content filter identified for the video game and for the second user to replace one or more keywords included in the input that are found offensive by the second user. The audio, text or chat content filtered and translated to the second language presented at a client device of the second user while the audio, text or chat content in the first language and unfiltered is presented at a client device of the first user.

In some implementations, the content filter is selected from a plurality of content filters, and wherein the plurality of content filters are provided on a selection interface with options for selecting/de-selecting a specific content filter, the plurality of content filters included in the selection interface being specific for the video game.

In some implementations, the second user is a player of the video game, and the modified representation of the second user is presented within a game scene of the video game rendered on a client device of the first user.

In some implementations, the second user is a spectator of the video game, and the modified representation of the second user is presented within an interactive interface provided alongside the content of the video game on a client device of the first user, wherein the interactive interface is used for providing audio, video, chat or text content related to the video game.

In an alternate implementation, a method for adjusting content of a video game is disclosed. The method includes receiving input from a first user during game play of the video game in a current game play session. The game play generates game content for rendering on client devices of the first user and a second user. The game content includes game characters of one or more users and game objects disposed within a game scene of the video game. The one or more users include at least the first user and the second user. The input is analyzed in accordance to game context of the video game to determine if the input of the first user is targeting the second user and is abusive in nature. When the input of the first user is determined to be abusive toward the second user, modifying the input of the first user to generate a modified input. The modified input is generated by filtering the input using a content filter identified for the second user. The modified input is provided along with the content of the video game to the client device of the second user for rendering.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
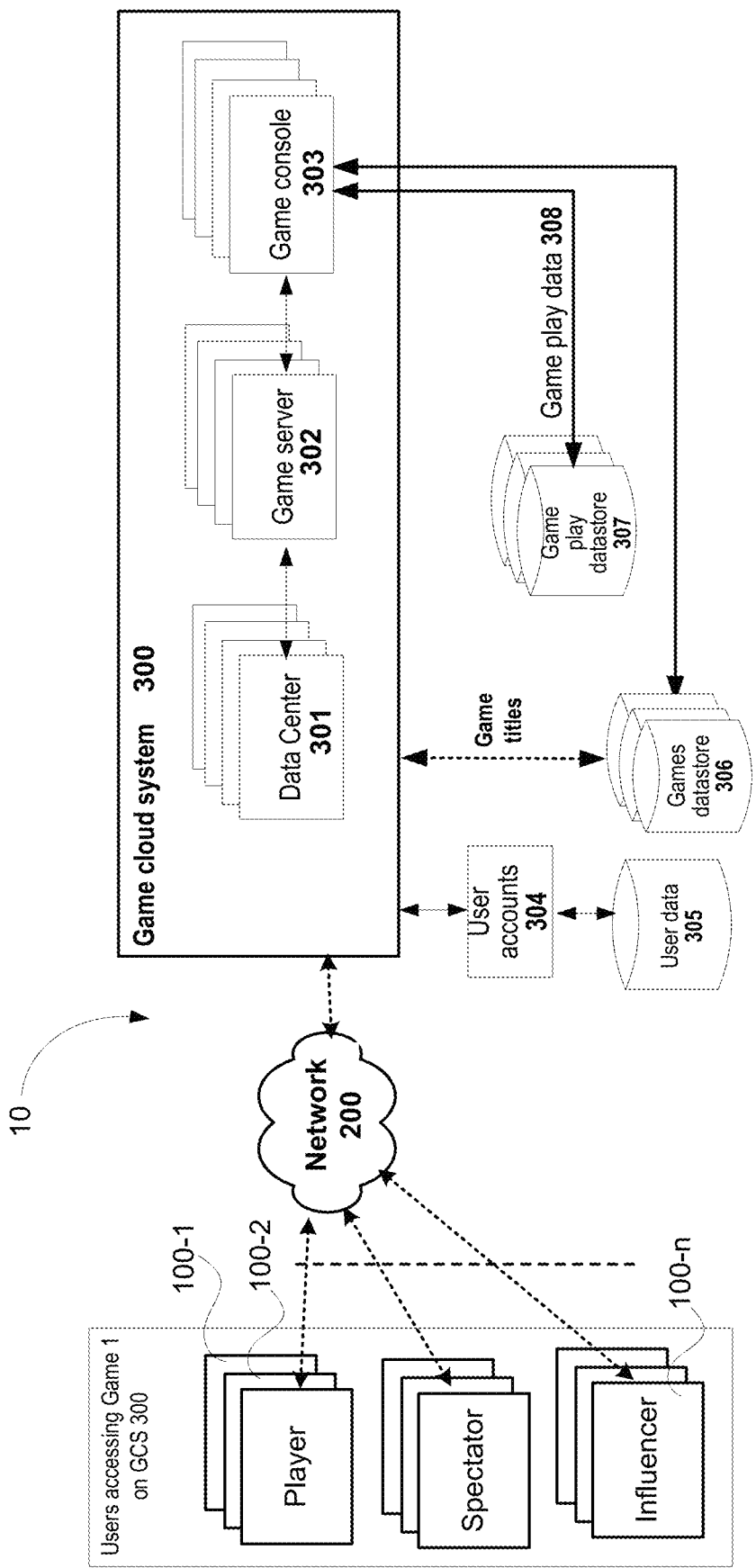
FIG. 1 illustrates a simplified conceptual game cloud system for adjusting representation of one or more users included in the content related to the video game based on inputs related to a video game provided by a plurality of users, in accordance with one implementation of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

In a massive multi-player video game, a plurality of users select a video game (or simply referred to as "game") from a game cloud server for either game play or for viewing/commenting on the video game played by users. The users provide inputs related to the selected video game. Inputs (e.g., game inputs) provided by some users (e.g., players) affect game state of the video game, while inputs provided by other users (e.g., spectators, influencers, players, etc.) may relate to game play of the game or relate to players playing the game or spectators viewing the game, wherein the inputs provided by other users include messages, comments, chats, observations, etc. The inputs provided by players are interpreted to perform certain actions in the game, which affect game state of the game. The video game may be a streaming video game that provides frames of game content for rendering on client devices of the users, in response to the game inputs from certain ones of the users (i.e., players) who have accessed to play the game.

The game inputs provided by users who are players are directed toward game items dispersed within a gaming scenario of the game. The game items within the gaming scenario include game objects, wherein the game objects may include background objects (i.e., non-player game items or non-player game assets) and foreground objects (e.g., icons/game objects/avatars, moving objects, etc.). The background objects are used to define gaming scenario of the game and may include game items, such as mountains, rivers, trees, buildings, billboards, castles, dungeons, etc. The foreground objects include static game objects, such as goal posts, basketball hoop, etc., and moving game objects, such as game characters associated with the player, one or more other players, monsters, etc.

The game inputs provided by a first user (e.g., a player) are interpreted to generate actions that are directed toward one or more game items/game characters in the gaming scenario. The action of the first user may affect one or more of the game items in the gaming scenario. In the MMO game, the video game receives game inputs from the plurality of users during game play of the video game, interprets the game inputs to generate specific actions that are to be performed in a gaming scenario accessed by the users, responsively update game state, and generate frames of game content that is streamed to the client devices of the plurality of users for rendering. The video game executing on the game cloud server is capable of live streaming the game play over a network, such as the Internet. The plurality of users may be accessing the video game from one geolocation or from multiple geolocations. In addition to game input, the first user may also provide additional inputs via interactive interface. The additional inputs may include comments related to their own game play of the video game or game play of another user or another user. The additional inputs may be provided in the form of video comment, audio comment, chat, messages, etc.

During the game play session of the video game accessed by the first user, when a second user initiates a request to access the video game, a content adjustment engine determines a behavior of the first user in the video game and in regards to the second user. To determine the behavior of the first user, the content adjustment engine retrieves inputs provided by the first user in a previous game play session of the video game, and analyzes the inputs in the context of the video game to determine if the inputs of the first user are in accordance to game objectives of the video game. The input may be in the form of audio data, video data, chat content, emojis, message content, etc., provided via interactive interface, and in-game actions. If the inputs are not in accordance to game objectives, the inputs are further evaluated to determine the behavior of the first user. If the inputs of the first user in the previous game play session were directed toward the second user and if the inputs were deemed inappropriate or intimidating or critical or prevented/blocked the game character of the second user from progressing in the game, or performed any other deliberate actions that adversely affected the game character of the second user, then the behavior of the first user is deemed abusive. On the other hand, if the intent of the first user was to guide the second user, assist the second user in overcoming a challenge or an adversary or to gain game related points/levels, then the behavior of the first user is deemed assistive. Depending on the intensity and the frequency of inputs of the first user targeting the second user and depending on the inputs adversely or constructively affecting the game play of the second user, the first user may be considered to be abusive or collaborative toward the second user. The first and the second users may be players of the video game, in some implementations. In alternate implementations, the first user may be a spectator viewing the game play of the game or an influencer who is providing comments on the game play of the game, and the second user may be a player playing the game or a spectator viewing the game play of the game.

When the comments or in-game actions of the first user are directed toward the second user and are harsh or intimidating, or inappropriate, the second user may view the first user as a cyber bully, lose interest in the game and leave the game prematurely. Further, due to the actions or comments of the first user, the second user may hesitate to return to the video game. To encourage the second user to continue playing the game and to prevent the second user from being harassed or targeted by the first user, the various implementations described herein disclose methods and systems for modifying a representation of the second user included in the content related to the video game. The representation of the second user is modified to hide a identity of the second user so that the first user will not be able to recognize the second user. The modified representation of the second user is included in the content of the video game presented to the first user while the original representation of the second user is included in the content of the video game presented to the second user and to other users of the video game. The other users may be affiliated with the second user or be unaffiliated with the first or the second user. In the case where some of the other users are affiliated with the first user, then those users who are affiliated with the first user will also be presented with the modified representation of the second user.

The second user may be represented in the content of the video game using a user identifier, an avatar, a game icon or a game character, etc. Modifying the representation of the second user includes modifying any and all identifiers/representations of the second user included in the content that reveal the identity of the second user.

The first user may also provide inputs that are directed toward their own game character, such as inputs that deliberately sacrifice the virtual lives of the first user. However, such inputs may not be considered harassing as they are not directed toward another player or user.

The inputs provided by each of the plurality of users during game play of the video game are maintained as part of game play data for the video game and stored in a game play datastore. The inputs include game inputs and comments. The game inputs are interpreted to define in-game actions that are used to influence a game state of the video game. The game state of the video game identifies overall state of the video game at a particular point and is influenced by intricacies of the game play and other interactions of each of the plurality of users. The game play data is processed by game logic of the video game to generate frames of content that is forwarded to client devices of the plurality of users for rendering. The game play data also includes any game customization provided by the respective user for the video game. The game customization of each user is stored as saved data.

The game play data provides detailed information related to game play style and interaction style of each of the plurality of users, from which the behavior of each user within the game and outside the game, game progression, game play competency, skill level, interaction type, target of interaction, interaction content, game context as applied to the interaction, etc., of the respective user can easily be deduced. In addition to details of the user, the game play data captures characteristics of each gaming scenario of the video game accessed by each user, characteristics of each action generated from the game inputs of each user, effects of such action in the gaming scenario, etc., which are processed to determine overall game state of the game. Characteristics of a gaming scenario may include details of game items available in the gaming scenario, such as type (e.g., static game items, moving game items, background objects, foreground objects, game characters of users, etc.) and number of game items of each type included in the gaming scenario, characteristics of the game items, such as location, size, color, shape, texture, etc., game item(s) targeted by an action generated from game inputs of each user, effect of the action on the game item(s), etc. The static game items in the gaming scenario may include a bush, a tree, a front yard, a back yard, a street, a building, a billboard, a bridge, non-player game characters (e.g., statues, images, etc.) provided by game logic, etc., and moving game items (i.e., dynamic game items) may include game characters or icons or avatars controlled by the user and by other users, monsters, dragons, a basketball in motion, a flying object, a runner, a cheetah chasing a prey, a launched missile, etc. The gaming scenario represents a location within the game where at least one game item (i.e., a static game item or a moving game item) is disposed, wherein the at least one game item may be a background object or a foreground object within the gaming scenario, etc. The game items in the gaming scenario appear in one or more frames of streaming game content provided for rendering on the client devices of the players.

In addition to modifying representation of the second user for presenting with content of the video game to the first user, the content adjustment engine, in some implementations, may also modify a representation of the first user and include the modified representation of the first user with content of the video game presented to the second user. The identity of the first user is masked to encourage the second user to access the video game without having the knowledge of the presence of the first user. For example, if the second user was intimidated or bullied by the first user, the second user may hesitate to access the video game and may get turned away from the game, especially when the first user is present. In order to prevent the second user from getting turned away from the video game, the representation of the abusive first user is modified to prevent the abused second user from recognizing the first user. The modified representation of the first user is presented with content of the video game to the second user while the original representation of the first user is presented with content of the video game to the first user.

Generally, most of the users that access the video game for game play or for viewing or commenting exhibit good behavior by providing inputs that generate actions or comments that are in accordance to the game objectives of the game. The actions generated by the users (e.g., players) are directed toward game characters associated with specific other player(s) or toward one or more game items within the gaming scenario. Similarly, comments provided by a user who may be a player or a spectator or an influencer, may be directed toward another user who may be a player or a spectator. However, there are some users who may periodically or consistently exhibit bad behavior. In some cases, these users may target their bad behavior toward a specific other user or in a particular video game but exhibit normal or good behavior with other users or in other video games. Similarly, not all of the bad behavior exhibited by some users is intentional. In some cases, the so-called "bad" behavior exhibited by some users may be unintentional. In such cases, the users exhibiting bad behavior may not even be aware that their behavior is bad. Due to the bad behavior exhibited by some users, the overall game play experience of other users gets significantly degraded, to the extent that the other users may get turned away from the video game. The content adjustment engine described herein assists in preventing the other users from getting turned away from the video game by providing an alternate solution wherein the representation of the other users that are being harassed or bullied or intimidated, is masked so that the user who tends to abuse the other users is unable to recognize the presence of certain ones of the other users in the content of the video game, thereby allowing the other users to enjoy the video game safely without fear of being recognized by the user. When the abusee' is aware of the presence of the abuser in the video game, they usually will shy away from the video game. As a result, the video game will attract less users, leading to loss in revenue for the video game hosting site. Thus, in order to improve the user base for the video game and to ensure that each user has an enriching game play experience, the game representation of the abusee' and, in some cases, of the abuser are modified and included with content of the video game presented to respective users. The modification is done in such a manner that neither the abuser nor the abusee' is aware of the presence of one another in the video game. The modified representation deters the abuser from recognizing and abusing the abusee' and enables the abusee' to access the video game without fear of being recognized and abused. This feature of modifying representation of users in the content of the video game allows the video game to attract and retain users. Various implementations of systems and methods of the present disclosure are described.

With the general understanding of the inventive embodiments, example details of the various implementations will now be described with reference to the various drawings.

FIG. 1 provides an overview of a game cloud site 10 used for accessing games for game play. The game cloud site 10 includes a plurality of client devices 100 (100-1, 100-2, 100-3, . . . 100-*n*) associated with a plurality of users (e.g., players, spectators, influencers), wherein the client devices are communicatively connected to a game cloud system 300 over a network 200. The game cloud system (GCS) 300 is configured to host a plurality of games and other interactive applications, such as social media applications, content provider applications (e.g., music streaming applications, streaming video applications, etc.), etc. The plurality of players may access the GCS 300 from a single geolocation or from a plurality of geolocations. The client devices 100 can be any type of client computing device having a processor, memory, and communication capabilities to access the network 200, such as LAN, wired, wireless or 4G/5G, etc., and may be portable or not portable. The client devices 100 may run an operating system and include network interfaces to access the network 200 or could be thin clients with network interface to communicate with the GCS 300 via network 200, wherein the GCS 300 provides the computation functions. For example, the client devices can be smart phones, mobile devices, tablet computers, desktop computers, personal computers, wearable devices, connected televisions, or hybrids or other digital devices that include monitors or touch screens with a portable form factor.

The client devices 100 having 5G communication capabilities may include mobile devices or any other computing devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

Users may access a video game available at the GCS 300 using a user account 304. In response to a user requesting access to a video game, the user account 304 of the user is verified against the user accounts maintained in a user datastore 305. In addition to verifying the user account of the user requesting access to the GCS 300, the game identified in the request is verified against a games datastore 306 to determine if the user is authorized to access the video game, prior to providing access to the video game. The verification is done by identifying all the game titles available at the GCS 300 that the user is eligible to view or play and validating the game title included in the user's request against the identified game titles. The games datastore 306 maintains a list of game titles that are or can be hosted at the GCS 300 and when new games are introduced, the game titles, game code and information related to the new games are updated to the games datastore 306. It should be noted that although the various embodiments are described in relation to a video game (also referred to as "game"), the embodiments can be extended to include any other interactive applications, such as streaming music applications, streaming video applications, etc.

After successful verification of the user and the game title included in the request, the GCS 300 identifies a data center 301 where the game can be hosted and sends a signal to the identified data center 301 to load an instance of the game associated with the game title identified in the request. In some implementations, more than one data center 301 may be hosting or capable of hosting the game. In these implementations, the GCS 300 identifies a data center 301 that is geographically proximal to the geolocation of the user. The geolocation of the user may be determined using Global Position System (GPS) mechanism within the client device 100 from which the user requests access, the client device's IP address, the client device's ping information, the user's social and other online interactions performed via the client device 100, to name a few. Of course, the aforementioned ways to detect the geolocation of the user are provided as examples and it should be noted that other types of mechanisms or tools may be used to determine the geolocation of the user. Identifying the data center 301 proximal to the geolocation of the user is to reduce the latency when transmitting game related data between the client device 100 of the user and the game executing at the identified data center 301. When more than one user requests to access the game, as will be the case in a MMO game, additional data centers 301 may be identified within the GCS 300, wherein each additional data center 301 is identified to be proximal to one or more players.

The data center 301 may include a plurality of game servers 302 and a game server 302 is selected based on the resources available at the game server 302 for hosting the game. In some implementations, an instance of the game may be executed on one or more game servers 302 either within the identified data center 301 or across multiple data centers 301.

In some implementations, the identified data center 301 may have some but not all of the necessary resources (e.g., bandwidth, processing, etc.) to host the game. In such implementations, the GCS 300 may identify a second data center 301 that is geographically proximal to the geolocation of the user and has the necessary resources to complement the resources available in the first data center 301 to host the game. The game is hosted on both the first and the second data centers and the game play data is synchronized between the first and second data centers.

The game cloud system 300 loads the game to the one or more game servers 302 in the identified data center(s) 301. The one or more game servers 302 include the hardware/software resources to satisfy the requirements of the game. The game server 302 may be any type of server computing device available in the GCS 300, including a stand-alone server, etc. Further, the game server 302 may manage one or more virtual machines supporting a game processor that executes an instance of the game for the user, on a host.

In some implementations, the one or more servers 302 may include a plurality of game consoles 303 and the game cloud system 300 may identify one or more game consoles within the identified one or more servers 302 to load the game. Each of the one or more game consoles may be an independent game console, or may be a rack-mounted server or a blade server. The blade server, in turn, may include a plurality of server blades with each blade having required circuitry and resources for instantiating a single instance of the game, for example. Of course, the game console described above is exemplary and should not be considered restrictive. Other types of game consoles, including other forms of blade server may also be engaged for executing an instance of the identified game. Once the one or more game consoles or game servers are identified, the generic game-related code for the game is loaded onto the identified game consoles 303 or game servers 302 and made available to the players requesting the game for game play.

In other implementations, the video game may be executed locally at the client devices 100 of the one or more users and metadata from the executing video game may be transmitted over the network 200 to the game server(s) 302 at identified data center(s) 301 of the GCS 300 for affecting the game state and for sharing the game play data with other users (e.g., spectators, influencers, such as commentators, advertisers, sponsors, etc.).

Inputs provided by the users are used to update content related to the video game that are provided to different users. The inputs may include in-game inputs, and inputs provided via interactive interface that is provided alongside game content of the game. Game inputs used to affect game state of the game may be provided by the users (i.e., players) using input devices, such as mouse 112, keyboard (not shown), etc.) or control interface (e.g., touch screen, etc.) associated with the client device 100, or from a hand-held controller (or simply referred to as "controller") (not shown) or any other peripheral device that is communicatively connected to the client device 100. Inputs provided via interactive interface may include video content, audio content, chat, emojis, messages, etc., and such inputs may be related to game play of the video game, or related to game character of a user or of other user, or related to a spectator. Inputs provided by each user during a previous game play session are analyzed to determine the behavior of the respective user. The inputs provided by each user during each game play session are part of game play data 308 that is stored in game play datastore 307. The game play datastore 307 stores the game play data for each user, for each game play session, and for each game. Inputs from the previous game play session(s) of a user are retrieved from the game play data 308 to determine the behavior of the user, and when the user is determined to be behaving badly toward a particular user, dynamically adjusting a representation of the particular user and including the adjusted representation with content of the video game presented during a current game play session. The inputs of the user provided during prior game play sessions of the video game along with game context of the video game, feedback from other users related to behavior of the user are provided as input to generate the behavior model (i.e., an artificial intelligence (AI) model) for each user. The behavior model for each user is refined as and when inputs are provided by the user. In some implementations, the inputs of the user are collected from different game play sessions of a plurality of games accessed by the user and used to create and refine the behavior model for the user. In yet another implementation, the inputs are collected from different game play sessions of a plurality of games accessed by a plurality of users and used in generating and training the behavior model for the user.

The MMO game includes a game engine (not shown) communicatively connected to game logic of the game in order to provide a framework for the game. The game engine, generally speaking, is a software layer that serves as a foundation for a game, such as the MMO game, and provides the framework that is used to develop the video game. The game engine abstracts the details of doing common related tasks (i.e., game engine tasks) required for every game, while the game developers provide the game logic that provides the details of how the game is to be played. The game engine framework includes a plurality of reusable components for processing several functional portions (i.e., core features) for the video game that bring the video game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the game.

When the game is selected for game play or for viewing game play, the game engine manages the game logic of the game, collects and transmits users game inputs received from one or more input devices associated with client devices 100, to the game logic. The game engine further manages, in an optimal manner, the allocation and synchronization of the functional portions of the game engine to process game play data generated by the game logic and generates frames of game content that is transmitted back to the client devices 100 for rendering. The game content includes gaming scenario of the game and interactive data related to the game provided by a plurality of users. A variety of game engines are currently available to provide different core functionalities and an appropriate game engine may be selected based on the functionalities specified for executing the video game.

The game inputs provided by each user during game play are interpreted to define in-game actions that are performed in the gaming scenario. The actions affect one or more game items that are available within the gaming scenario, which affect game state of the game. The game state of the game identifies overall state of the game at a particular point and is influenced by intricacies of the game inputs provided by each player. The game inputs and other inputs of each user, the game actions generated from the game inputs, the effect of the actions of each user on the game items available in each gaming scenario are saved as game play data. Additionally, the other inputs including comments provided in video format, audio format, chats, message format, emojis, etc., are also saved as game play data and are used to update the interactive interface provided with the content of the video game. The game play data also includes the saved data of each player, wherein the saved data of a player includes any game customization provided by each user of the game. The behavior model, generated for each user and trained using inputs provided by each user in the video game and in other video games and interactive applications, is used to determine details and extent of effect the inputs of the user had on other users. For example, the behavior model may be used to determine which inputs provided by the user are considered to be bad, which inputs are considered to be good, the specific user(s) (e.g., users or game characters of users) targeted by the inputs, extent (i.e., amount, frequency, intensity, etc.) of targeted inputs toward specific user(s), consistency of such inputs toward the specific user(s) from the user, etc., to determine if the inputs targeting a specific user were intentional or accidental, etc. Using the details from the behavior model, the system can establish the user as exhibiting good or bad. In some implementations, the behavior of the user may be established based on how the behavior of the other users' generating same or similar inputs was evaluated. The inputs of each user are continuously monitored and the behavior of the user updated/validated to ensure that the behavior of the user established by the system using the behavior model accurately reflects the intentions of the user toward specific other users. Based on the established behavior, the representation of the other user is dynamically modified to hide the identity of the other user and the modified representation of the other user is included with content of the video game presented to the user whose inputs targets the other user. The modified representation of the other user curbs the user from providing inputs targeting the other user, thereby curtailing the abusive behavior of the user toward the other user.

Figure 2:
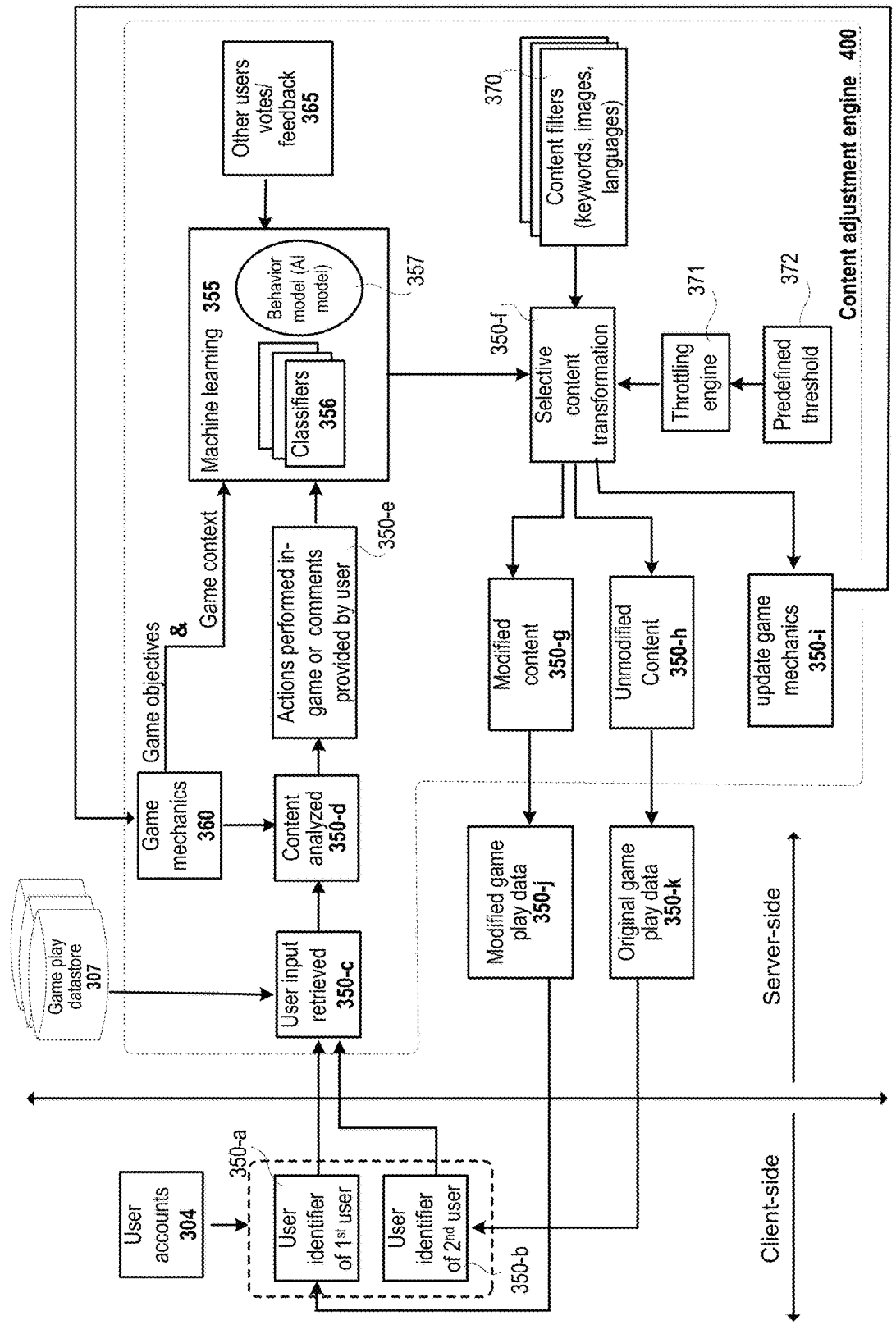
FIG. 2 illustrates a simplified data flow related to a video game for inputs received from one or more users, wherein the inputs are processed to generate modified content related to the video game included with content provided to select one of users, in accordance with one implementation of the present disclosure.

FIG. 2 illustrates a simplified flow of data followed for modifying a representation of a user included with content of a video game, to mask the user's identity. The modified representation of the user is included with the content of the video game presented to certain ones of other users so as to ensure that their identity is masked while original representation of the user revealing the identity of the user is included with the content of the video game presented to the user.

Figure 3:
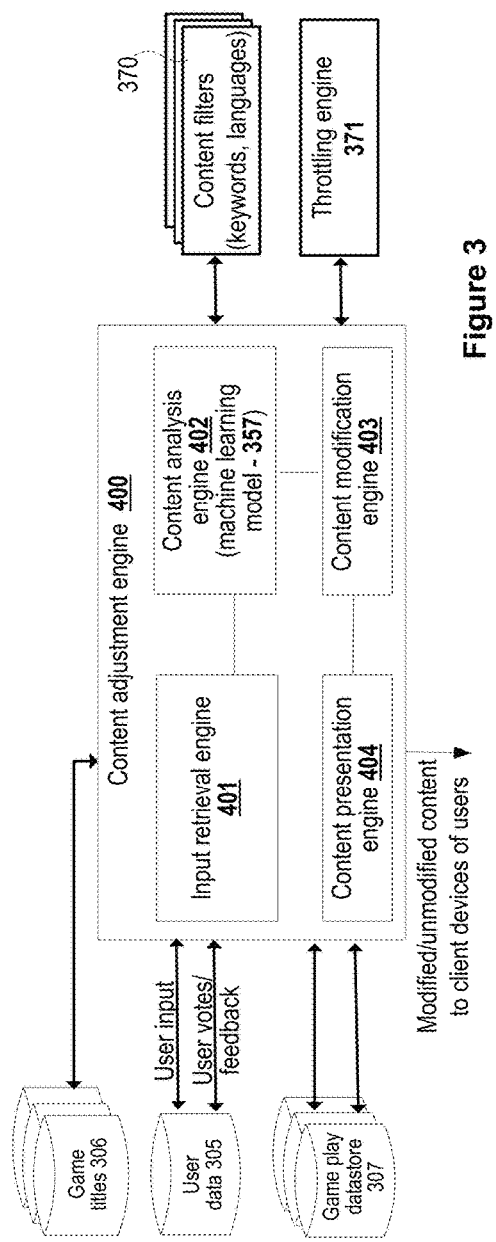
FIG. 3 illustrates a simplified block diagram of different modules within a content adjustment engine used in detecting and processing input from different users, modifying content related to the video game and presenting modified/unmodified content to different users, in accordance with one implementation of the present disclosure.

FIG. 3 illustrates a simplified block diagram of a plurality of modules of a content adjustment engine 400 that is used to dynamically modify a representation of a user included with the content of the video game presented to a second user based on a behavior of the second user toward the user. The content adjustment engine 400 may be integrated within the game logic of the video game, or may be maintained distinctly from the game logic of the game and executed either on the same server executing the game logic or on a different server. In the case of the content adjustment engine 400 being executed on a different server, the different server executing the content adjustment engine 400 is communicatively coupled to the server executing the game logic of the game, so as to be able to collaborate with the game logic to include an original representation or a modified representation of the user behavior of the player.

The content adjustment engine is used to analyze inputs provided by a user during a previous session of accessing the video game to determine if the inputs are targeting a specific other user and the intent of the user in the video game. If the intent of the user was good and the inputs targeting the specific other user was assistive in nature, the behavior of the user during the previous session is deemed good. On the other hand, if the inputs of the user targeting the specific other user was aggressive or intimidating, then the behavior of the user in the previous session is deemed abusive. The input of the user may be a game input provided as the user is interacting within the gaming scenario or may be a comment or observation provided via an interactive interface, such as a chat interface, comment interface, etc. The comment or observation may be related to game play in general, related to a specific game item, or related to game play of another user and directed toward a specific game character of the another user included within a gaming scenario of the video game. Knowing the behavior of the user, when a second user accesses the video game, the content adjustment engine 400 determines whether to generate and include a modified representation of the second user or just include an original representation of the second user with content presented to the user. When the behavior of the user is good, the original representation of the second user may be included with the content of the user. However, when the behavior of the user is bad and the bad behavior of the user is known to be directed toward the second user, the modified representation of the second user is dynamically generated and included with the content of the video game presented to the user. The content presented to the second user includes the original representation of the second user.

Some example modules within the content adjustment engine 400 includes input retrieval engine 401, content analysis engine 402, content modification engine 403, and content presentation engine 404, to name a few. In some implementations, one or more of the modules can be integrated into other modules. In other implementations, additional modules may be included to perform finer processing of the game inputs to define the game play behavior of the player.

Referring simultaneously to both FIGS. 2 and 3, the method of generating a modified representation of a user and including the modified representation of the user with content presented to other users begins when a request to access a current game play session of a video game is received from a first user. The first user requests access to the video game executing on a game console 303 or on a game server 302 within a data center 301 of a game cloud system 300 over a network 200 using a user identifier 350-a. The request of the first user is received from a first client device associated with the first user. The user identifier 350-a of the first user is verified against user accounts 304 for the video game to determine if the first user is an authorized user. The user identifier 350-a is also verified against game titles included in the games datastore 306 to determine if the first user is authorized to access the game title of the video game. Based on successful verification of the first user, the first user is provided access to the current game play session of the video game. Access to the current game play session includes providing content of the video game for rendering on the client device of the first user and allowing the first user to provide inputs to the video game, wherein the inputs may include in-game inputs and/or inputs provided via interactive interface. The content of the video game provided to the first user includes gaming scenario created from game play data, and any comments, messages, audio data, video data, emojis, etc., provided via an interactive interface by a plurality of users that are playing or viewing the current game play session of the video game. The different types of data included in the interactive interface are rendered alongside the gaming scenario of the video game.

The first user may be a player who has accessed the video game for game play, or may be a spectator who has selected the video game for viewing, or may be an influencer who has accessed the video game to provide commentary or advertisement/promotional content for the video game. Irrespective of the role of the first user, access to the video game allows the first user to provide inputs to the video game during the current game play session, wherein the inputs include in-game inputs (when the first user is a player) and/or comments related to the video game provided via the interactive interface, wherein the first user is a player, a spectator or an influencer. The comments provided by the first user may be related to overall game play of the video game, or game play of a specific player or a specific team of players, or comments related to a specific spectator or a specific group of spectators.

During the current game play session, a second request to access the current game play session of the video game in which the first user is present, is received from a second user. The first user may be present within the gaming scenario of the video game or may be present in the interactive interface that is used to provide comments, messages, video data, audio data, emojis, etc., related the video game. The request from the second user is received from a second client device associated with the second user. The request is validated against the user accounts 304 and against the game titles included in the games datastore 306 using a second user identifier 350-b associated with the second user. The second user is verified in a manner similar to the first user described above. Upon successful verification of the second user and just before providing access to the current game play session to the second user, the content adjustment engine 400 evaluates the behavior of the first user who is already present in the current game play session of the video game. The behavior of the first user is determined by evaluating the inputs provided by the first user during prior one or more game play sessions. An input retrieval engine 401 of the content adjustment engine 400 is used to query the game play datastore 307 for the game play data for the one or more game play sessions of the video game in which the first user has provided inputs and retrieve the game play data corresponding to the inputs provided by the first user. In some implementations, the input retrieval engine 401 may also be used to retrieve game play data of other users who have provided the inputs during the one or more game play sessions of the video game. In some other implementations, the input retrieval engine 401 may query and retrieve game play data corresponding to inputs (350-c) provided by the first user from game play sessions of a plurality of video games. The game play data 350-c related to the inputs of the first user from the plurality of video games may be used to determine the overall behavior of the first user and not just from the video game associated with the current game play session. For instance, the inputs provided by the first user in a first video game may be in accordance to the game objectives of the first video game while the inputs provided by the first user in a second video game may not be in accordance to the game objectives and may even be considered abusive toward a second user. As previously indicated, the inputs may include in-game inputs and comments/messages provided via interactive interface. The game play data 350-c for the one or more previous game play sessions of the one or more video game retrieved from the game play datastore 307 are provided as inputs to content analysis engine 402 for content analysis 350-d.

The user input 350-c provided as input by the input retrieval engine 401 is analyzed 350-d by the content analysis engine 402, in the context of the video game, to determine if the inputs provided by the first user are appropriate. The content analysis engine 402 interacts with the game mechanics 360 to obtain the game objectives and determine the game context, analyzes the user inputs 350-d of the first user in the context of the video game to determine if the user inputs are in accordance to the game objectives and are contextually relatable to the video game. It is to be noted that the game mechanics 360 is used interchangeably with game logics to refer to programming logic of the video game that is used to process input of the game to generate game play data. The content analysis engine 402 performs an initial analysis of the inputs 350-d of the first user to determine if the inputs were provided within the gaming scenario of the video game or via the interactive interface 350-e that is presented alongside the gaming scenario content of the video game. The inputs provided by the first user within the gaming scenario may be interpreted to perform actions within the gaming scenario of the video game. The inputs provided via the interactive interface may be in the form of comments, messages, audio content, video content, emojis, etc., related to the game play of the video game, game play of a specific player present in the gaming scenario, interactions of a spectator, interactions of a player with other players, spectators, influencers, etc.

After determining the type of inputs (e.g., in-game inputs or interactive inputs) provided by the first user in the one or more previous game play sessions of the video game, the content analysis engine 402 performs further analysis in accordance to game context and game objectives of the video game to determine if the input of the first user is in accordance to the game objectives or not. When the input of the first user is in accordance to game objectives, then the behavior of the first user is deemed good or appropriate. When the input of the first user is not in accordance to the game objectives, the behavior of the first user may be deemed bad or inappropriate. It is noted that not all inputs of the first user can be deemed abusive or inappropriate. Some of the inputs of the first user may not be in accordance to the game objectives but may not be inappropriate. For example, the first user may have provided a number of comments via the interactive interface within a short period of time in one or more previous game play sessions of the video game and the number of comments may have exceeded a predefined threshold volume defined for the video game. Generally, when a user provides a large number of comments within a short duration of time, the inputs of the user may be considered to be spamming or harassing, particularly when such inputs (e.g., comments) are directed toward a game character of a second user included in the gaming scenario of the video game or within the interactive interface. However, not all large number of comments provided by the first user within a short duration can be considered harassing the second user. For instance, the first user may be providing inputs (e.g., in the form of textual or audio comments) to guide the second user through a difficult challenge within the video game or to direct the user along a specific path within the gaming scenario. In such cases, the volume of the inputs of the first user within the short period of time may be contextually relatable and justified, and is not considered to be spamming or harassing the second user.

In another instance, the inputs provided by the first user may have targeted the second user but may have been provided to encourage the second user during game play, wherein the second user may be a novice player and the first user may be an expert or a coach for the video game. In this instance, even though the inputs exceeded the predefined threshold volume defined for the duration of time, the inputs of the first user are not inappropriate. Thus, in order to properly determine the true intent of the first user and to correctly deduce the behavior of the first user in the video game, particularly toward other users, the inputs from the prior game play sessions are contextually analyzed in accordance to the game objectives of the video game. The context of the video game may be obtained from corresponding game mechanics (i.e., game logic) 360. In some implementations, in addition to obtaining inputs of the first user from the video game accessed during the current game play session, the inputs of the first user are obtained from other video games and used to determine the overall behavior of the first user in relation to different video games. The overall behavior of the first user provides the behavior of the first user in different video games. For instance, the first user may behave well in one game but may behave badly in another game, wherein the first user may harass or behave rudely with another user. The overall behavior of the first user may be used to penalize the first user during the current game play session of the video game when the overall behavior of the first user is bad, or to reward the first user during the current game play session of the video game when the overall behavior of the first user is good. In addition to the inputs of the first user, inputs of other users may also be obtained for the other video games in which the first user has provided inputs and used to determine the overall behavior of the first user in relation to the other users. Sometimes, the inputs of the first user may have been in response to another user's inputs targeting the first user. Thus, in order to provide a full perspective of the first user, the inputs of the first user and of the other users from a plurality of game play sessions of the video game and of the other video games are collected and analyzed in the context of the respective video games. The game context of the respective video games may be obtained from the appropriate game mechanics 360 and used by the content analysis engine 402 to determine the intent of the first user, from which the behavior of the first user toward other users in the video game can be deduced.

The behavior of the first user and of the other users accessing each video game are determined using machine learning. The machine learning uses the contextually analyzed inputs of the first user and, in some instances, of other users from a plurality of game play sessions of the video game, and, in some instances, from a plurality of video games to build and train a behavior model 357 (an artificial intelligence model). The behavior model is continuously and dynamically trained (i.e., updated) as and when additional inputs of the first user are available for the video game and, when the inputs from the other video games are being considered, for other video games. The behavior model 357 includes a plurality of layers of nodes, with each consecutive pair of nodes in the same layer and/or in consecutive layers being connected by edges. To build the behavior model, a plurality of classifiers is identified. Various attributes of the inputs (e.g., type (in-game or interactive input), game item targeted by the input, other user targeted by the input, type of action generated from the input, frequency of the input, content (e.g., keywords that can be used to determine the behavior) of the input, language used in the input, etc., are identified and used to define the plurality of classifiers 356. In addition to the attributes of the input, the game objectives and game context from game mechanics 360 are also considered in defining the classifiers 356. In some implementations, additional input from other users, such as feedback and votes 365 from other users related to the behavior of the first user in the video game(s), may also be considered in generating and training the behavior model. In this implementation, relying on the feedback of a single user (e.g., the second user) may not be sufficient as the feedback from the second user may be negatively biased toward the first user or may be provided prematurely. To prevent such biased feedback and to avoid relying only on the single user (i.e., second user), feedback from other users who were witness to or present during a time when the first user provided the actions/inputs in the prior game play sessions, may also be considered as inputs to the behavior model. The feedback from other users may be in the form of in-game votes provided using a voting interface made available alongside the content of the video game. The votes of the other users can be used as additional metric to validate the second user's perception of the first user's behavior.

The various inputs provided by the content analysis engine 402, game mechanics 360, and feedback 365 are used to populate the nodes of the behavior model 357 with the edges defining the relationship between the attributes and other details included in the consecutive pair of nodes. As additional inputs are detected from the first user and/or the other users during the current game play session of the video game or from game play sessions of other video games, the nodes are refined, and the edges between the corresponding consecutive pair of nodes defining the relationship are strengthened or weakened depending on the type of additional inputs detected. Outputs from the behavior model 357 relating to the contextually analyzed inputs of the first user are identified and used to define the behavior of the first user. The outputs defining the behavior of the first user may be influenced by the inputs of other users. For instance, the inputs of the first user may be processed within the behavior model in a manner similar to how the same type of inputs provided by the other users were processed, so that the output corresponding to the inputs of the first user are similar to the output identified for other users providing the same type and amount of inputs as the first user. In some implementations, the behavior of the first user in other video game(s) may influence identifying the output defining the behavior of the first user in the video game associated with the current game play session.

From the trained behavior model, the machine learning determines the type of input provided by the first user and the type of action(s) generated from the input that caused the first user to be tagged or voted as an abuser. Using this knowledge, the machine learning can automatically identify and flag another user (e.g., third user) who provides similar inputs as an abuser in the future.

The output from the behavior model defining the behavior of the first user are provided to the content modification engine 403 to perform selective content transformation 350-*f*. The behavior of the first user may be specific to the video game accessed during current game play session or may be the overall behavior of the first user who has accessed and participated in a plurality of video games. In this example, selective transformation may include transforming a representation of a user included in the content of the video game, or transform some portion of the content in accordance to preference of the user. The transformation of content may include adjusting number of inputs provided by a user within the video game, or identifying and filtering out certain ones of keywords that may be considered offensive or inappropriate to a user and replacing the filtered out keywords with alternate keywords, or translating the inputs of a user into alternate language preferred by a user and dynamically filtering out the inputs in the alternate language prior to presenting to the user. A predefined threshold volume of inputs that can be provided within a short duration of time may be defined for each user, and when the number of inputs provided by the user exceeds the predefined threshold volume, the number of inputs may be throttled down accordingly.

Upon determining from the output of the behavior model that the first user was behaving badly in the prior game play sessions of the video game and/or other video games and was targeting their inputs toward the second user in a manner that may be considered harassing or be abusive, the content modification engine 403 may be triggered to perform selective content transformation 350-*f*. The content modification engine 403 may be triggered in response to detecting a request from the second user to access the video game during the current game play session in which the first user is present. The triggered content modification engine 403 is used to dynamically generate a modified representation of the second user for inclusion with the content of the video game presented to the first user. The modified representation is generated so as to mask the identity of the second user so that the first user cannot detect the second user in the video game. The second user may be a player providing in-game inputs or a spectator of the video game providing interactive interface inputs. The first user may be a player providing in-game inputs specifically targeting a game character associated with the second user, or a spectator or an influencer providing inputs (e.g., comments) via the interactive interface and specifically targeting the second user. To provide a simple example, the second user is presumed to be a user exhibiting good behavior and providing inputs that are in accordance to game objectives of the video game. The various users may be represented within content of the video game as game characters, game identifiers, game icons, pictures, etc., that can be used to identify the users within the content of the video game. The content of the video game includes gaming scenario having game objects (e.g., animate objects, inanimate objects) and game characters of one or more users, and content provided via an interactive interface. The content provided by users via the interactive interface includes comments, audio data, video data, textual content, emojis, graphical content, etc., wherein each content provided via the interactive interface are associated with a representation of the corresponding user that provided the content, wherein the representation reveals the identity of the user providing the content.

Selective content transformation, in some implementation, can include generating a modified representation of a user that is present in the content of the video game, wherein the content includes gaming scenario content and interactive interface content. The modified representation of the user is selectively included with the content of the video game provided to select ones of other users, wherein the modified representation is provided in place of the original representation of the user. In the above example, upon determining the first user's (350-$a$) behavior being bad toward the second user (350-$b$) and upon detecting the second user's (350-$b$) request to access the video game, the content modification engine 403 dynamically generates a modified representation (350-$g$) of the second user for including with the content of the video game presented to the first user. Generating the modified representation includes generating a modified game character or a modified graphic representation of the second user. In some implementations, the modified game character or modified graphic representation is associated with a modified user identifier identified for the second user. Similar to the original representation, the modified representation is also associated with the second user. The modified representation of the second user deters the first user from behaving badly with the second user as the first user is unable to identify the second user in the content of the video game. The masking allows the second user to access the video game without fear of being recognized and abused by the first user. The content modification engine 403 also maintains and includes the original representation (350-$h$— i.e., unmodified representation) of the second user with content of the video game presented to the second user and to remaining ones of other users.

In some implementations, when a first user is part of a first team in which certain ones of other users are members and the second user is part of a second team in which remaining ones of other users are members, the modified representation of the second user is provided to each of the members of the first team in which the first user is a member and the original representation of the second user is presented to the members of the second team. The selective transformation allows maintaining at least two different representations of the user so that either the original or the modified representation of the user can be included with content of the video game presented to different users. Associating the modified representation of the second user with a modified user identifier ensures that the modified representation of the second user is not being presented under the original user identifier that the first user can easily identify.

In some implementations, the modified representation of the second user is generated to inherit certain ones of the user attributes (e.g., physics attributes, such as size, motion, direction, speed, location, skillset, etc.) associated with the original representation (i.e., unmodified content 350-$h$). Although only physics attributes are mentioned, it is to be noted that other user attributes of the second user may also be applied to the modified representation of the second user.

In some implementations, the modified representation of the second user may be provided as overlay over the original representation substantially masking the original representation of the second user in the content of the video game. In such implementations, the inherited user attributes of the modified representation of the second user are synchronized with the corresponding user attributes of the original representation of the second user so that the modified representation behaves in a manner similar to the original representation of the second user in the video game while successfully masking the identity of the second user. The first user who receives the content of the video game including the modified representation of the second user will not even be aware that a switch in the second user's representation has been made in the content of the video game. The game mechanics 360 is dynamically updated 350-$i$ to ensure that the game mechanics 360 recognizes the modified representation of the second user so that inputs (in-game inputs or interactive interface inputs) provided by the second user in the video game can be associated with the modified representation of the second user.

In alternate implementations, the modified representation of the second user may be provided in place of the original representation of the second user in the content of the video game. In these implementations, as in the previous implementations, the modified representation of the second user is generated to inherit some of the user attributes associated with the original representation. The inherited user attributes allow the modified representation of the second user to behave in a similar manner as the original representation so that the first user will not be able to detect that a switch in the second user's representation has been made in the content. The game mechanics 360 is dynamically updated 350-$i$ to ensure that the modified game mechanics 360 is able to recognize the replacement of the original representation of the second user with the modified representation (i.e., modified content 350-$g$) and associate the game inputs provided by the second user to the modified representation of the second user provided with the content of the video game to the first user. In both the implementations, the second user and select ones of other users are provided with the original representation (i.e., unmodified content 350-$h$) of the second user with the content of the video game.

In addition to generating a modified representation of the second user and including with the content of the video game presented to the first user, the content modification engine 403 may also generate a modified representation of the first user and include the modified representation of the first user with content presented to the second user. This may be advantageous as the second user may hesitate to access and participate in the video game during the current game play session when the second user detects the presence of the first user in the video game. To encourage the second user to participate in the video game, when the content modification engine 403 detects a request from the second user to access the video game during the current game play session, the content modification engine 403 dynamically generates a modified representation of the first user (i.e., modified content 350-$g$) and includes the modified representation of the first user with the content of the video game provided to a client device of the second user for rendering. As with the modified representation of the second user, the game mechanics is updated 350-$i$ to recognize the modified representation of the first user so that inputs provided by the first user can be associated with the modified representation of the first user.

In some implementation, the content modification engine 403 may generate the modified representation of the second user by identifying an alternate game character/alternate graphic representation for the second user and associating the alternate game character/alternate graphic representation with the second user. In some implementation, the alternate game character/alternate graphic representation may be associated with a modified identifier of the second user. In alternate implementation, the alternate game character/alternate graphic representation of the second user may be associated with original user identifier. In this implementation, it is to be understood that the user identifier is not being presented with the content of the video game as this would defeat the whole purpose of masking the identity of the second user. The original user identifier, instead, is an internal index by which the inputs and the content of the video game associated with the second user are indexed and stored. It should be noted that whenever the user identifier is to be presented with the content of the video game, the modified representation of the second user is associated with and presented with the modified user identifier identified and associated with the second user.

If the game character/graphic representation of the second user is to be modified within the gaming scenario, the content modification engine 403, in one implementation, performs the selective transformation of content 350-f by identifying an alternate game character/alternate graphic representation of the second user. In some implementations, the alternate game character/alternate graphic representation of the second user may be selected by the second user and may be included within the user profile of the second user and the content modification engine 403 retrieves the alternate game character from the user profile for inclusion in the content of the video game. In alternate implementations, the alternate game character/alternate graphic representation of the second user may be selected by the content modification engine 403. The content modification engine 403 then forwards the alternate game character/alternate graphic representation to the content presentation engine 404.

When the modified representation of the second user has to be included within the gaming scenario of the video game, the content presentation engine 404 interacts with the game mechanics 360 to integrate (i.e., inject) the alternate game character/graphic representation of the second user within the gaming scenario of the video game to generate the modified game play data 350-j. The integration is done, in one implementation, by overlaying the alternate game character/graphic representation over the original game character of the second user within the gaming scenario of the video game. In alternate implementation, the integration is done by replacing the original game character of the second user within the gaming scenario with the alternate game character/alternate graphic representation of the second user. In addition to overlaying or replacing the original game character, the content presentation engine 404 associates at least some of the user attributes of the original representation of the second user to the modified representation so that the modified representation included in the modified game play data 350-j behaves in a similar manner as the original representation of the second user within the gaming scenario. In alternate implementations, the modified representation of the second user is associated with its own user attributes to allow the modified representation to behave differently than the original representation. In this implementation, the user attributes associated with the modified representation may be default user attributes or alternate user attributes defined within the user profile of the second user.

If the game character/graphic representation of the second user has to be modified in the interactive interface in addition to or instead of modifying in the gaming scenario, the content presentation engine 404 interacts with the interactive interface module (not shown) of the game mechanics 360 to inject (i.e., overlay or replace) the modified representation of the second user into the interactive interface to generate the modified game play data 350-j that includes the gaming scenario (modified or unmodified) and the modified interactive interface content. The modified game character/graphic representation of the second user is associated with the original user identifier or a modified user identifier of the second user so that the inputs provided by the second user in the interactive interface can be associated with the modified representation. The modified game play data 350-j that includes the modified representation of the second user in the gaming scenario and/or the interactive interface within the modified content 350-g is presented to a client device of the first user 350-a for rendering. The unmodified content 350-h with the original representation of the second user defining the original game play data 350-k is forwarded to the client device of the second user 350-b for rendering.

In addition to generating modified representation of a user, the content modification engine 403 is also configured to perform selective content transformation 350-f during current game play session by dynamically analyzing and adjusting content included in the interactive interface inputs provided by a plurality of users, including the first user. The dynamic adjustment is done to ensure that the content presented to each user during the current game play session is in accordance to the respective user's preferences or rendering standards. As mentioned previously, the interactive interface inputs may include different types of content, such as audio content, video content, textual content, graphic content, messages, emojis, etc., provided by different users during the current game play session. The interactive interface inputs may relate to general game play of the video game, or may include comments related to game play of a particular player, comments related to inputs provided by a spectator via the interactive interface, comments related to interactions provided by a player, comments related to interactions of the spectator, etc. Prior to forwarding the content of the video game to the client device of each user, the content (e.g., in-game inputs and interactive interface inputs) of the video game is analyzed to ensure that the content meets the preferences or rendering standards set for each user (i.e., is in accordance to the content preferences of each user). The preferences may be set by the user, by an administrator, by a parent for a child user, or any other user who has been granted the authority to set the preferences for the respective user. In some implementations, the user or an authorized person may set different preferences for different types of content, for different video games, etc.

In some implementations, a plurality of content filters (e.g., mom filter, dad filter, grandma filter, teen filter, friend filter, etc.) may be provided on a selection interface with options for user selection/de-selection of a content filter. In some implementations, a content filter specific for the video game may be selected for or by the user, and the user is provided with the selection interface with an option to de-select the selected content filter. In addition to de-selecting, the selection interface may also provide an option to select another content filter for applying to the content of the video game. Alternatively, the machine learning model 357 within the content analysis engine 402 may select a particular content filter from the plurality of content filters defined for the video game. The machine learning model 357 may select the particular content filter that best suits the user, based on information gathered from user attributes maintained in the user profile of the user. In addition to allowing the machine learning model 357 to select the content filter, the user may be provided with options on a selection interface (not shown) to over-ride the selection of the content filter by the machine learning model 357 by providing options to de-select the particular content filter and to select another content filter. The content filter selected for or by the user is then used for filtering content prior to forwarding the content to the client device of the user for rendering. A different content filter may be selected for filtering each type of content. A content filter may be selected for or by the user during an initial setup of the video game, and the selection interface may be accessed at any time during the rendering of content of the video game to allow the user to over-ride the content filter selection. The selection interface with the plurality of content filters provides the user with sufficient control to decide when to filter, what content to filter, and which content filter to select/de-select so that content presented to the user is in accordance to their preferences.

The content filter(s) 370 selected for a user are used to dynamically filter the content included in the interactive interface inputs and, in some cases, in-game inputs provided during current game play session, prior to forwarding the content to the client device of the user for rendering, so that the filtered content complies with the preferences set for or by the user. For example, when the interactive interface inputs and/or the in-game inputs provided by different users include textual content, a text-based content filter 370 may be selected for the user (e.g., first user, second user, etc.), for analyzing the textual content to determine if the textual content includes certain keywords that deemed inappropriate or unacceptable for presenting to the user. When the textual content includes such keywords, the selected content filter may be used by the content modification engine 403 to select alternate keywords that are mapped to the keywords for replacing the keywords in the textual content. The content filter selected for the user may be specific for the user. For example, certain keywords may be considered offensive by a particular user but may not be considered offensive by another user. Similarly, the alternate keywords mapped to the offensive keywords may be specific for each user. For example, when a particular offensive keyword is included in the interactive interface inputs, a first spectator may want to replace the offensive keyword with the alternate keyword, "OMG", while a second spectator may want to use "Oh, Fudge," while a third spectator may want to use, "Oh Fidely do," and so on. The keywords and the alternate keywords for each user may be maintained by the content filter 370 in a repository and referred to by the text-based content filter 370 when the content included in the inputs need to be filtered for each user. The content filter is selected by the content modification engine 403 based on the preferences of the respective user defined in their user profile and the keywords are filtered out in accordance to the respective user's preferences.

In some other implementations, when the interactive interface inputs provided by the users in the video game include graphic or image or video content, the content filter selected for a user correspond to these types of content so that an appropriate alternate graphic content, alternate image, or alternate video may be identified to replace or overlay over a corresponding portion of the graphic, image or video content that is found offensive for the user. Similarly, when audio content is included and portion of the audio track includes swearing words (i.e., offensive keywords), an appropriate audio content filter is selected for the user so that a portion of an alternate audio track may be selected to replace the portion of audio track that includes inappropriate content for the user.

In some implementations, the content modification engine 403 may perform select content transformation 350-*f* by identifying a content filter for a user for translating the content included in the inputs provided by different users from a first language to a second language of the user's preference. The content modification engine 403 uses the information provided in the user profile of each user to identify the language of preference for the respective user and select the content filter for the respective user accordingly. The content filter is used to translate the content of the inputs to the second language for presenting to the respective user's client device for rendering. In addition to converting the content of the inputs to the second language, the selected content filter or a second content filter may be used to filter the content of the inputs in the second language so as to ensure that the content of the inputs in the second language do not include inappropriate or offensive keywords, images, emojis, etc.

In addition to modifying representation of a user and modifying content to filter out offensive content, the content modification engine 403 is further configured to adjust a volume of inputs provided by a user during current game play session of the video game. In some implementation, the inputs provided by the first user may be via the interactive interface and may include a number of comments provided within a short duration of time. The comments provided by the first user may be targeting the second user. The comments may or may not be offensive or abusive in nature. Usually, when a first user generates a number of comments within the short duration of time, the comments are usually considered to be spamming or, in some cases, abusive, especially when the comments directed toward a second user include certain keywords or emojis, for example. In order to determine the intent of the first user and to determine if the first user is being abusive, the comments provided by the first user are contextually analyzed in accordance to game context and game objectives of the video game. The contextual analysis is used to determine if the type and number of comments within the short duration are relevant to current game state of the game. In addition to contextual analysis, the inputs are analyzed to determine if the inputs are directed toward a specific user(s) (e.g., the second user) and include keywords or images or audio tracks that may be deemed offensive by the specific user. Although in the current example, the process of adjusting the volume of the inputs provided via interactive interface is discussed, it should be noted that similar process may be engaged in adjusting volume of inputs provided by the first user toward the second user within the gaming scenario, if necessary.

Contextual analysis and content analysis of the inputs enables the content modification engine 403 to determine true intent of the first user providing the inputs—i.e., whether the inputs were generated to assist the second user (e.g., comments to guide the second user to overcome a challenge, follow a certain path, etc.) in the gaming scenario, or approve or commend the second user's interactions (textual, video, audio, etc.) within the interactive interface, or to harass or abuse the second user. When the inputs are encouraging or assistive in nature, the inputs of the first user are not adjusted by the content modification engine 403.

If, on the other hand, the inputs of the first user are shown to be abusive in nature, the content modification engine 403 relies on a throttling engine 371 to determine if the number of inputs provided by the first user exceeds a predefined threshold volume 372 defined for the video game. The predefined threshold volume 372 may be specified for each user, for each video game, or for each game play session. If the number of inputs exceeds the predefined threshold volume 372 specified for the user in the video game for the current game play session, the content adjustment engine 403 in association with the throttling engine 371 throttles down the volume of the inputs provided in the interactive interface so that the throttled down inputs are below the predefined threshold volume 372. The throttling down may include removing (i.e., muting) certain number of inputs provided by the first user in the interactive interface. The inputs that are targeted for removal may be identified based on the content included within or may be temporal based (i.e., first few comments, last few comments, etc.). For example, the inputs that include more of the keywords that are deemed inappropriate by the second user may be removed as part of throttling down. In addition to throttling down volume, the inputs included with the content of the video game provided to the second user are filtered using the appropriate content filters identified for the second user to ensure that the content presented to the second user are in accordance to the preferences or rendering standards of the second user. The throttled down number of inputs from the first user are provided as modified content 350-g to the content presentation engine 404. The modified content 350-g provided by the content modification engine 403 to the content presentation engine 404, in some implementations, may include one or more of modified representation(s) of first/second user, filtered content, translated content, throttled down inputs.

The content presentation engine 404 then sorts the modified content into different groups depending on which user is to receive the modified content. Thus, based on the inputs provided by the first user, the modified content 350-g provided in the modified game play data 350-j forwarded to the client device of the first user 350-a includes modified representation of the second user within the gaming scenario and/or in the interactive interface and the original inputs (i.e., unmodified volume, language, and content). Similarly, the modified content 350-g included in the modified game play data 350-j provided to the client device of the second user 350-b includes modified inputs (i.e., modified volume, modified language, throttled down volume) and, where appropriate and available, modified representation of the first user. Including the original volume of inputs to the first user makes the first user believe that the content provided to the users has not changed while the throttled down version provided to the second user will be in accordance to the rendering standards of the second user and is within the predefined threshold volume 372. Dynamically throttling down the inputs and filtering the content prior to presenting the content to the second user ensures that the second user is not exposed to the abusive behavior of the first user and do not feel threatened or bullied.

Thus, the content modification engine 403 identifies different content filters depending on the user including type of user (player, spectator, influencer), the type of content and the type of filtering that needs to be done to the content provided via the inputs (i.e., in-game and interactive interface inputs) by different users, and apply the appropriate content filters to adjust the content of the video game prior to forwarding to the client device of the respective users. The filtered content is associated with the original representation or modified representation of the corresponding users, depending on which user the content is being forwarded for rendering on their respective client devices.

Figure 4:
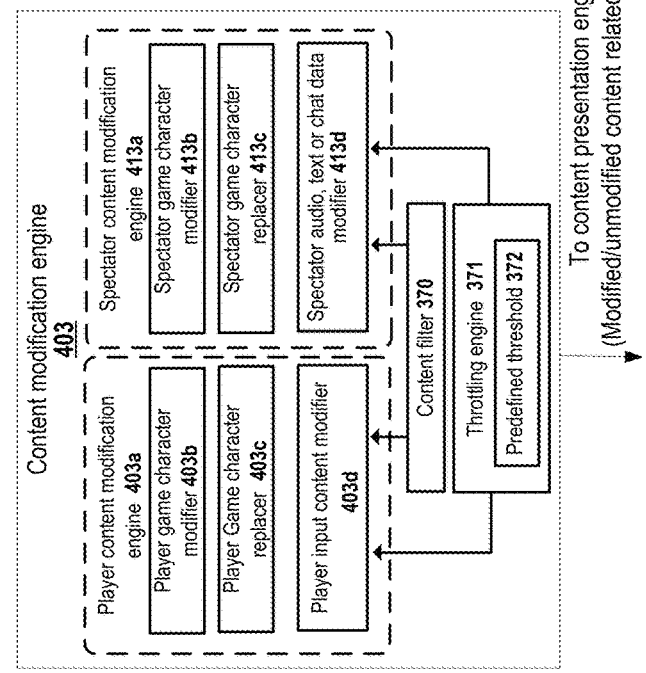
FIG. 4 illustrates a simplified block diagram of different modules within a content modification engine of the content adjustment engine used for modifying selective content of the video game, in accordance with one implementation of the present disclosure.

FIG. 4 illustrates the various modules of the content modification engine 403 that are used to modify the content of the video game prior to forwarding to respective users during a current game play session, in accordance to one implementation. Some example modules included in the content modification engine 403 includes a player content modification engine 403a and a spectator content modification engines 413a, in one implementation.

The player content modification engine 403a is configured to modify representation of a player included in the gaming scenario and rendered in the interactive interface, and/or content generated by the player via the interactive interface during current game play session of the video game. In one implementation, a player game character modifier 403b is used to identify and modify a game character associated with the player within the gaming scenario of the video game. The player is a user who is accessing the video game for game play and is providing game inputs within the gaming scenario. The game character of the player may be dynamically generated in response to detecting a request from the player for accessing the video game for game play in which a first user who is known to have harassed or abused the player during previous game play sessions, is already present. The harassing nature and the target of harassment of the first user was determined by analyzing inputs of the first user from prior game play sessions of the video game, in one implementation. In other implementations, interactions from prior game play sessions of a plurality of video games in which the first user and the player participated are analyzed to determine the behavior of the first user toward the player. The first user may be another player, a spectator or an influencer. The player game character modifier 403b modifies the game character of the player by identifying and replacing certain ones of features of the game character of the player. The certain ones of the features are selected to be relevant in hiding the identity of the player. The selected features are overlaid over the respective original features of the game character of the player and the overall user attributes associated with the original game character of the player are applied to the selected features included in the modified game character of the player. The applied user attributes allow the selected features to mimic the corresponding original features but assist in hiding the identity of the player. The modified game character of the player is associated with a user identifier of the player, wherein the user identifier of the player acts as an index to store the modified game character with the user profile and other user attributes of the player in the user datastore 305. In an alternate implementation, the modified game character is associated with a modified user identifier identified for the player so as to truly hide the identity of the player, wherein the modified user identifier includes a screen name, a screen identifier, etc., that may be rendered alongside the game character and may reveal the identity of the player. The modified game character of the player is included within the gaming scenario of the video game for the current game play session accessed by select one(s) of users that are shown to be abusive to the player. The modified game character may also be included, where appropriate, within the interacting interface through which the player provides inputs related to the current game play session of the video game.

A player game character replacer module 403c is used to identify an alternate game character to replace the original game character of the player within the gaming scenario. This is different from the player game character modifier module 403b, wherein only select ones of features of the game character are overlaid. The alternate game character of the player is generated to inherit some of the relevant user attributes (e.g., physics attributes, attributes related to game play, etc.) of the original game character of the player, so that the modified game character, when rendered at the client device of the other users, mimics the actions and interactions of the player, except the identity of the player is hidden. The alternate game character of the player is dynamically injected into the gaming scenario of the video game replacing the original game character of the player, in response to providing access to the video game for the player. The alternate game character of the player is associated with the player and is selectively injected into the gaming scenario of the video game provided for select one(s) of users while remaining users of the video game, including the player, are presented with the gaming scenario which includes the original game character of the player. The select one(s) of users for whom the alternate game character of the player are provided are known to have abused the player during prior game play sessions. The select one(s) of users with the modified gaming scenario are not even aware of an alternate graphic representation of the player in the content of the video game and are, therefore, unable to detect the player in the gaming scenario. The alternate game character of the player may also be included with other interactive interface inputs to select one(s) of the users for rendering on their client devices. In one implementation, the alternate game character is associated with original user identifier of the player, wherein the user identifier is not rendered alongside the game character.

In an alternate implementation, the alternate game character is associated with a modified user identifier of the player. This may be the case when the user identifier is represented by a screen name, a screen identifier, etc., in addition to being a index for storing the alternate game character of the player in the game play datastore 307. Since the screen name or screen identifier may reveal the identity of the player, when presented with the game character of the player in the content of the video game, it may be necessary to associate the modified game character with a different user identifier (i.e., modified user identifier) instead of the original user identifier so as to truly hide the identity of the player. Both the modified game character and the modified user identifier are associated with the player so that the inputs provided by the player in the video game can be associated with both the original representation and the modified representation of the player. The original game character of the player is included with the content of the video game forwarded to the client device of the player and to other users who are not known to abuse the player.

The player content modification engine 403a may use a player input content modifier 403d to adjust content included in the inputs of the player, in one implementation. The input content may include comments (audio, text or chat content) provided by the player via interactive interface during game play of the current game play session. The inputs may be provided by the player to exchange comments with other players or spectators. In one implementation, the player may be the abuser or may provide inputs that may be not be appropriate to some or all users of the video game. To ensure that the comments meet the interaction standards set for other users and to ensure that the comments are not abusive toward specific user/player, the content of the inputs are filtered using appropriate content filters defined for each user receiving the content of the video game that includes the inputs of the player. As mentioned previously, the content may be analyzed using appropriate content filters 370 to identify and replace keywords or images that are inappropriate, translate input from one language to a different language of a user's preference, throttle the number of inputs provided by the player using a throttling engine 371 when the number of inputs exceeds a predefined threshold volume 372 defined for the player and for the video game before the content from the player is forwarded to the client device of different users.

Similar to the content related to the player being modified, content related to a spectator may be modified prior to forwarding the content to client device of different users. The content related to a spectator may include graphic representation of the spectator and any inputs provided by the spectator during current game play session. Any content related to the spectator may be identified, analyzed, and, if needed, modified using a spectator content modification engine 413a prior to forwarding to client devices of other users for rendering. The spectator may be a user who is accessing current game play session of the video game for viewing and, in some cases, providing inputs related to the game play of the game. The graphic representation of the spectator is provided on an interactive interface that is rendered alongside the gaming scenario of the video game. Where inputs are provided by the spectator during current game play session, the graphic representation is rendered alongside such inputs on the interactive interface. When the spectator requests access to the video game for viewing, the graphic representation of the spectator content modification engine 413a will verify if any user who has been abusive toward the spectator in previous game play sessions are already participating in the current game play session of the video game. The user who has been abusive may be another spectator or another player or an influencer, such as a user who provides commentary on the video game. Upon confirming presence of the user who is abusive toward the spectator in the video game, the graphic representation of the spectator is modified using spectator game character modifier 413b, and the modified graphic representation of the spectator is included in the interactive interface forwarded with the content of the video game to the abusive user. The spectator game character modifier 413b identifies and overlays select ones of features of the original graphic representation with corresponding alternate features to generate the modified representation. The modified representation adopts the user attributes of the original graphic representation of the spectator. In alternate implementation, a spectator game character replacer module 413c may be used to identify an alternate graphic representation and use the alternate graphic representation in place of the original graphic representation of the spectator in the interactive interface provided to the user who is known to be abusive to the spectator. The alternate graphic representation inherits the user attributes of the spectator and is associated with the user identifier of the spectator. The original graphic representation of the spectator is included with content of the video game presented to the spectator and other users who are not known to be abusive to the spectator.

In addition to modifying graphic representation of the spectator, the inputs of the spectator may be modified prior to forwarding the inputs with the content of the video game to other users. The inputs of the spectator may include comments provided in a text, audio, graphic, image, emoji, chat, message, or video format, or may include votes provided via the interactive interface. The comments may be directed toward another spectator, another group of spectators, a player, group of players, or may relate to the overall game play of the video game. The spectator may be the abuser or the abusee'. When the spectator is known to be abusive toward a second spectator or a player, the inputs of the spectator may be modified before including the spectator's inputs with the content of the video game forwarded to the second spectator or the player. The inputs provided by the spectator may include certain keywords that may not be appropriate for the second spectator or the player, or may be in a different language, etc. A spectator input content modifier module 413d of the spectator content modification engine 413a is used to modify the content of the inputs before it is forwarded to the client device of the second spectator or the player. The spectator input content modifier module 413d uses appropriate one or more content filters to filter the content in accordance to the preferences defined by or for the second spectator or the player, wherein the content filter is used to identify and replace keywords, images with alternate keywords, images, and/or translate from a first language to a second language, etc., to generate the modified inputs, which are then included in the interactive interface and presented with the gaming scenario of the video game to the second spectator or the player.

When an amount of inputs of the spectator, who is the abuser, exceeds a predefined threshold volume 372 defined for the spectator and for the video game, the spectator input content modifier module 413d uses the throttling engine 371 to adjust the volume of inputs and forward the adjusted (i.e., throttled down) inputs with the other content of the video game to the client device of the second spectator or the player. The modified content of the video game, with the modified graphic representation of one or more users (i.e., spectator, second spectator, etc.), filtered and/or translated and/or throttled down content, is forwarded with the gaming scenario of the video game of the current game play session to the respective users—i.e., spectator, second spectator, player, etc.

Figure 5A:
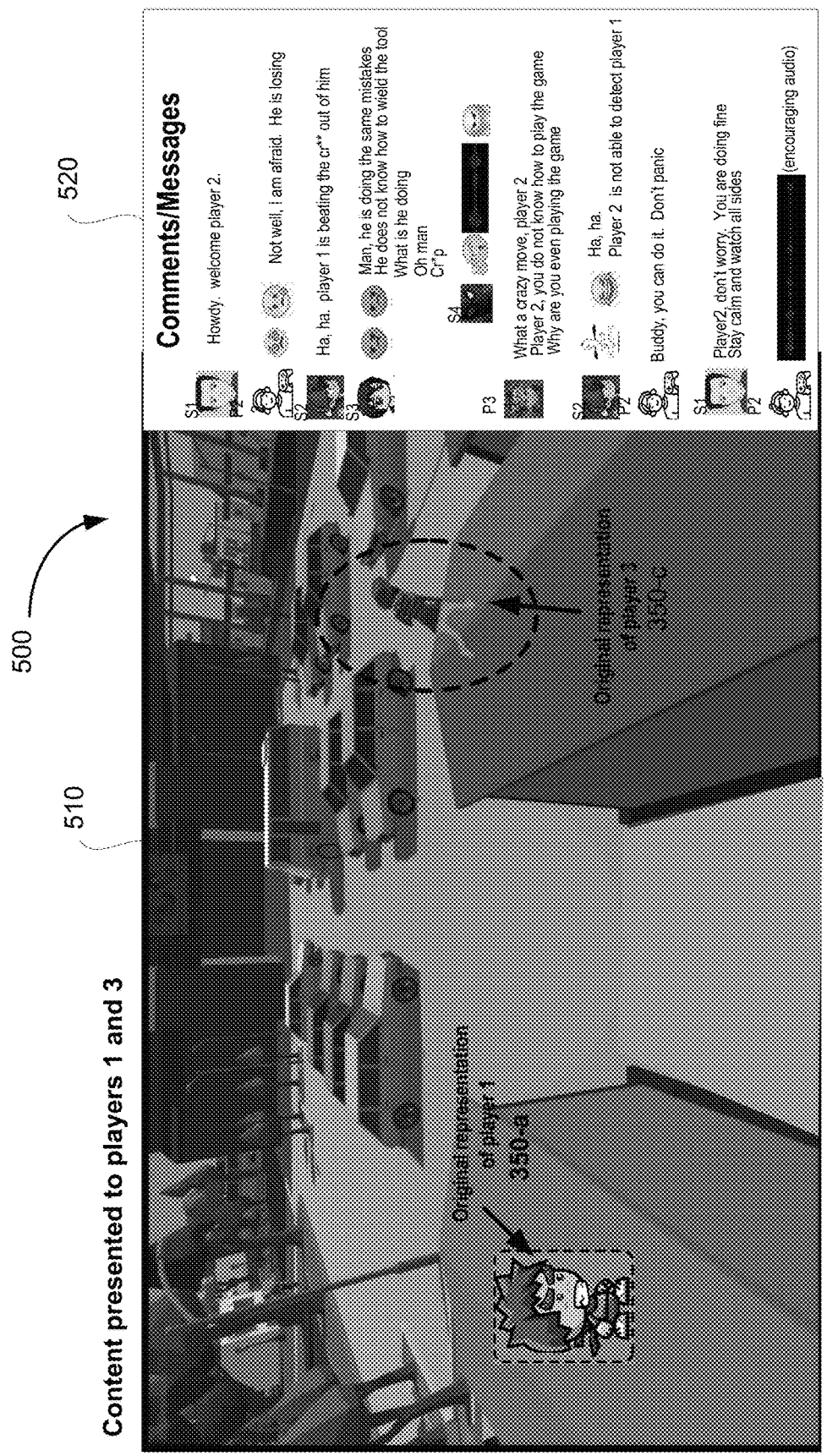
FIGS. 5A-5D illustrate simplified game related content modified based on analysis of input of a user, in accordance with some implementations of the present disclosure.

FIG. 5A illustrates a sample content 500 related to current game play session of video game accessed by a first player 350-a and a third player 350-c, in one implementation. The content 500 includes gaming scenario 510 of the video game, and an interactive interface 520 for use by users of the video game to post comments (e.g., game related comments, user related comments, etc.), chat with other users, post audio tracks, video content, texts, messages, graphics, emojis, graphic interchange formats (GIFs), etc. The interactive interface 520 can be used by players, spectators and influencers (i.e., users) of the video game. The gaming scenario 510 includes game objects (e.g., background objects, foreground objects, stationary objects, moving objects, etc.), and game characters of the players playing the video game. FIG. 5A illustrates one such gaming scenario 510 in which game characters of a first player 350-a and a third player 350-c are shown to be present and the interactive interface is shown alongside the gaming scenario 510 showing the comments/messages provided by or exchanged between users, wherein the users providing the comments includes players and spectators. The content 500 related to the video game shown in FIG. 5A are presented to both the first and the third players 350-a, 350-c.

Figure 5B:
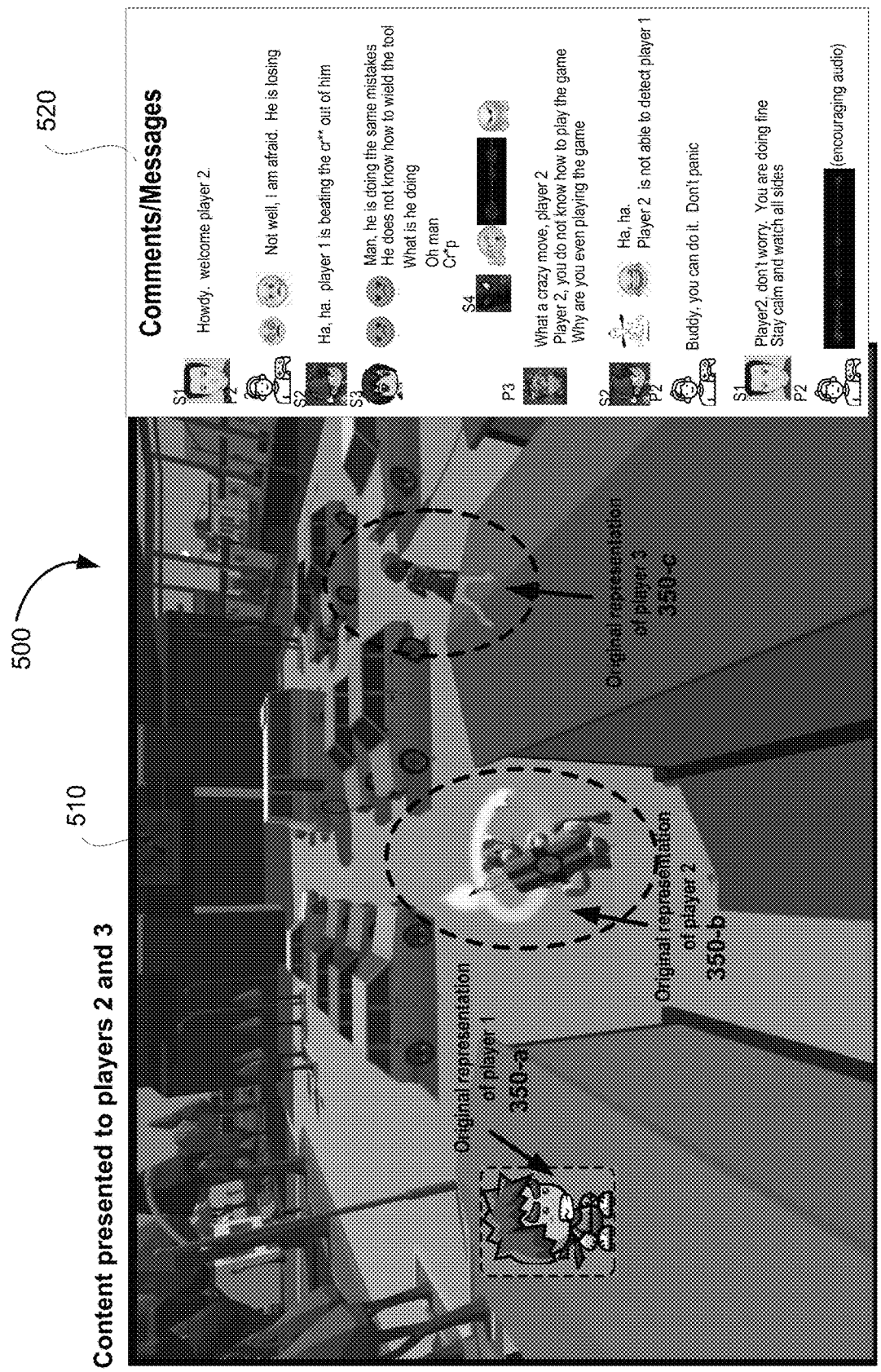

FIG. 5B illustrates the content 500 of the video game presented to a second player in response to the request of the second player to join the game play of the video game, in one implementation. In some cases, content 500 of the video game presented to the second player may also be presented to the third player. The content 500 of the video game in FIG. 5B differs from the content illustrated in FIG. 5A, in that a representation 350-b of the second player is included in the content 500 of the video game. The content 500 presented to the second player, and, in some cases, the third player include the gaming scenario 510 with the original representation of the first, second and the third players (350-a, 350-b, 350-c), respectively.

Figure 5C:
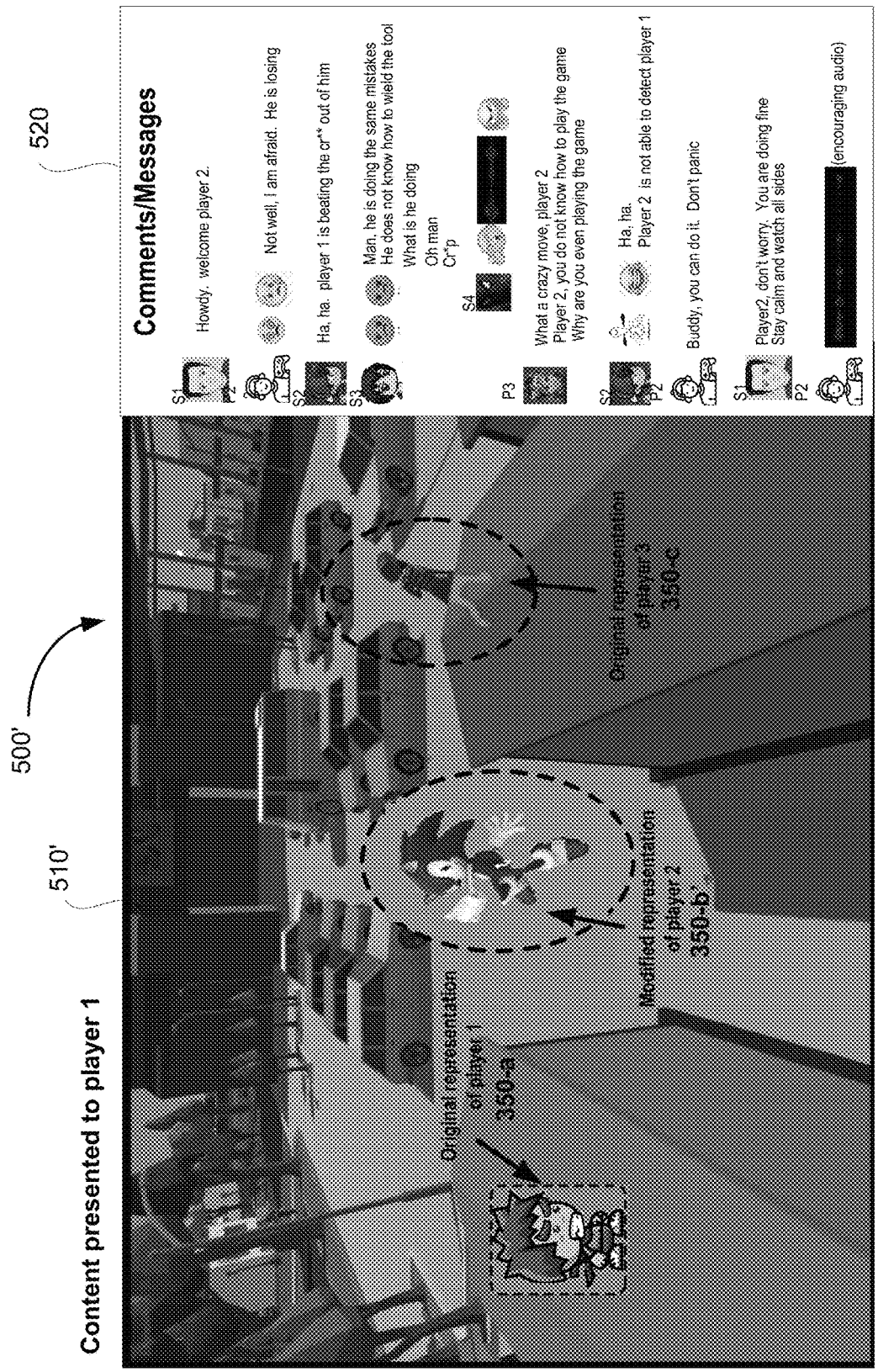

FIG. 5C illustrates an implementation wherein graphic representation of a game character of a player is modified in the gaming scenario of the video game presented to some users. In this implementation, a second player requests access to the video game that is being played by the first and third players (350-a, 350-c), as shown in FIG. 5A. In response to the request, the behavior of the first and the third player that are already present in the gaming scenario are evaluated from the prior game play sessions of the video game and/or other video games. Based on the evaluation, it may be determined that the first player 350-a had been abusive to the second player 350-b in the prior game play sessions while the third player 350-c had not been abusive. Based on this evaluation and responsive to the request from the second player to join the game play of the video game during a current game play session, the original graphic representation 350-b of the second player in the gaming scenario 510 of the video game is replaced with an alternate graphic representation 350-b' to define modified gaming scenario 510'. The alternate graphic representation 350-b' is associated with the second player. The alternate graphic representation 350-b' may be overlaid over the original graphic representation 350-b of the second player or may be injected into the gaming scenario instead of the original representation 350-b of the second player. The modified gaming scenario 510' is used to generate the modified content 500' for the video game. The modified content 500' includes the original representation of players 1 and 3 (i.e., 350-a, 350-c) and the alternate graphic representation 350-b' of the second player that hides the identity of the second player. The alternate representation may be a default representation selected by the second player and stored in the user profile of the second player or may be selected randomly by the content modification engine 403. The modified content 500' is presented to the first player in response to providing access to the second player to access the video game.

Figure 5D:
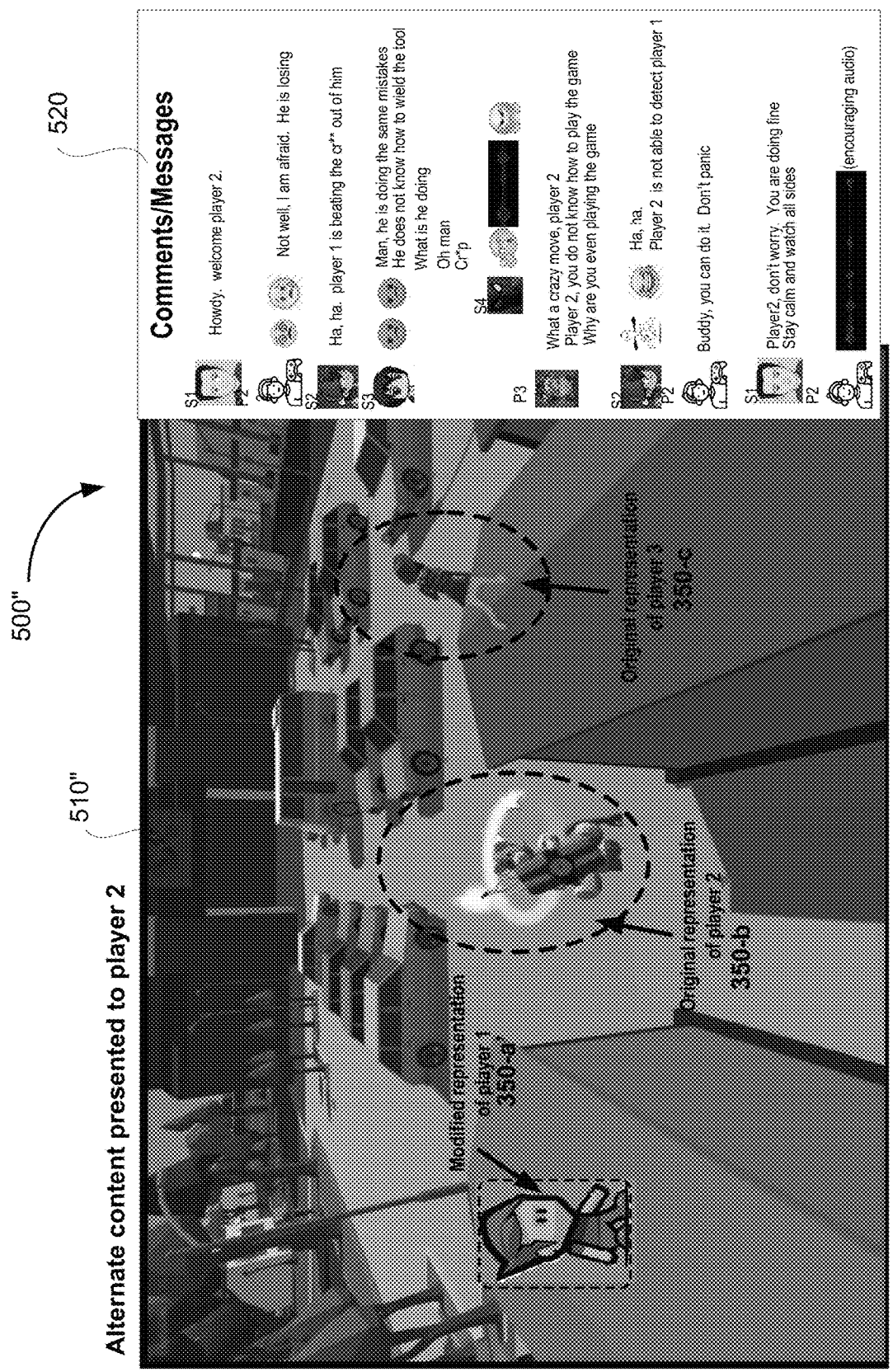

FIG. 5D illustrates an alternate content 500" of the video game presented to certain ones of the players, in one implementation. The alternate content 500" may be generated in response to the second player's request to join in game play of the video game in which players 1 and 3 are already present. The behaviors of the first and third players are determined from inputs provided by the first and the third players during prior game play of the video game. Accordingly, the first player has been shown to be abusive to the second player while the third player has been shown to be neutral. Based on the evaluation, a modified content 500" is generated for the video game in which the original representation 350-a of the first player is replaced by a modified representation 350-a' to define the gaming scenario 510". The modified content 500" with the original representations 350-b, 350-c, of the second and third players and the modified representation 350-a' of the first player along with the content of the interactive interface 520 are presented to the second player. The modified representation 350-a' of the first player is provided to hide the identity of the first player so as to encourage the second player to play the video game and to not shy away upon detecting the presence of the first player in the video game. The first player may be presented with content 500' that includes original representations of the first and the third players but a modified representation of the second player, as shown in FIG. 5C. The third player may be presented with content 500 shown in FIG. 5B (i.e., original representations of the first, second and third players), or content 500' shown in FIG. 5C (i.e., original representations of the first and third players and modified representation of the second player), or content 500" shown in FIG. 5D (i.e., modified representation of first player and original representations of second and third player). The content presented to the third player may depend on the affiliation or non-affiliation of the third player with the first player or the second player. Providing the modified representation 350-b' of the second player to the first player is to deter the first player from identifying and abusing the second player, and providing the modified representation 350-a' of the first player to the second player is to prevent the second player from recognizing the first player and shying away from the video game.

FIGS. 6A-6F illustrate inputs provided via the interactive interface that are used to modify content of the video game provided to different users, in accordance to some implementations. The inputs may be used to modify game characters within the gaming scenario to hide identity of a player. Alternatively, the inputs may be filtered in accordance to presentation preference of select ones of users (i.e., players or spectators). Or, the inputs may be used to modify graphic representation of certain ones of the users before the content of the video game including the inputs are presented to different users.

Figure 6A:
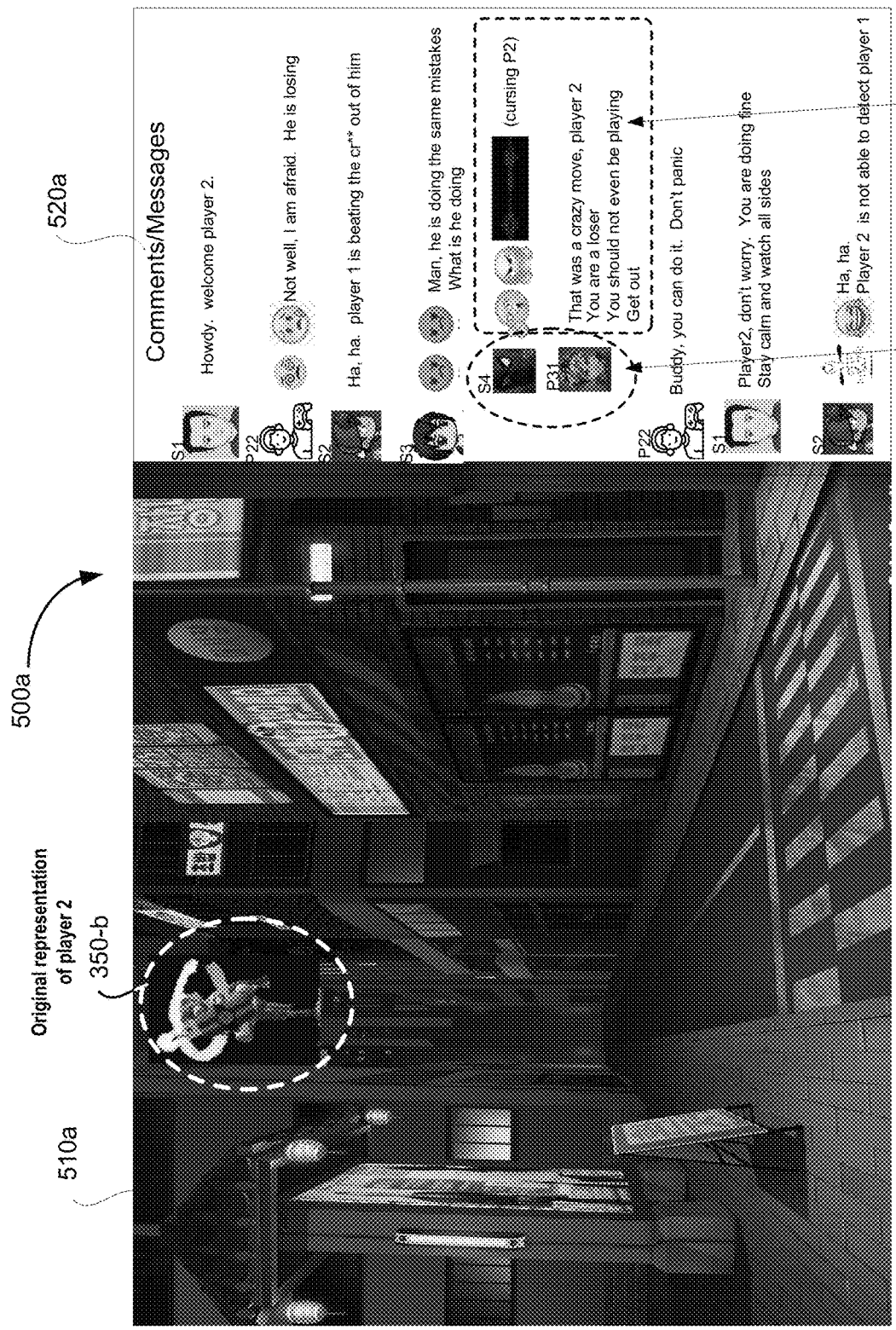
FIGS. 6A-6F illustrate simplified game related content modified based on analysis of inputs of users, in accordance with different implementations of the present disclosure.

FIG. 6A illustrates an example content 500a of the video game presented to different users, in one implementation. The different users may be spectators and/or players. The content 500a includes a gaming scenario 510a in which a graphic representation of player 2, 350-b, is present, and interactive interface 520a in which comments provided by different users are presented. The interactive interface 520a is shown to include original representations of the different users, including original representation of spectator 4 and player 31, and comments provided by all users including comments provided by spectator 4 and player 31. Certain ones of the users (e.g., spectator 4 and player 31) are shown to be providing inputs (e.g., in textual, audio, etc., formats) that are not in accordance to the rendering preference of player 2, and, in some cases, may include language/keywords that can be considered as harassing player 2. Content 500a of the video game, in one implementation, may be presented to different users other than player 2, spectator 4 and player 31.

Figure 6B:
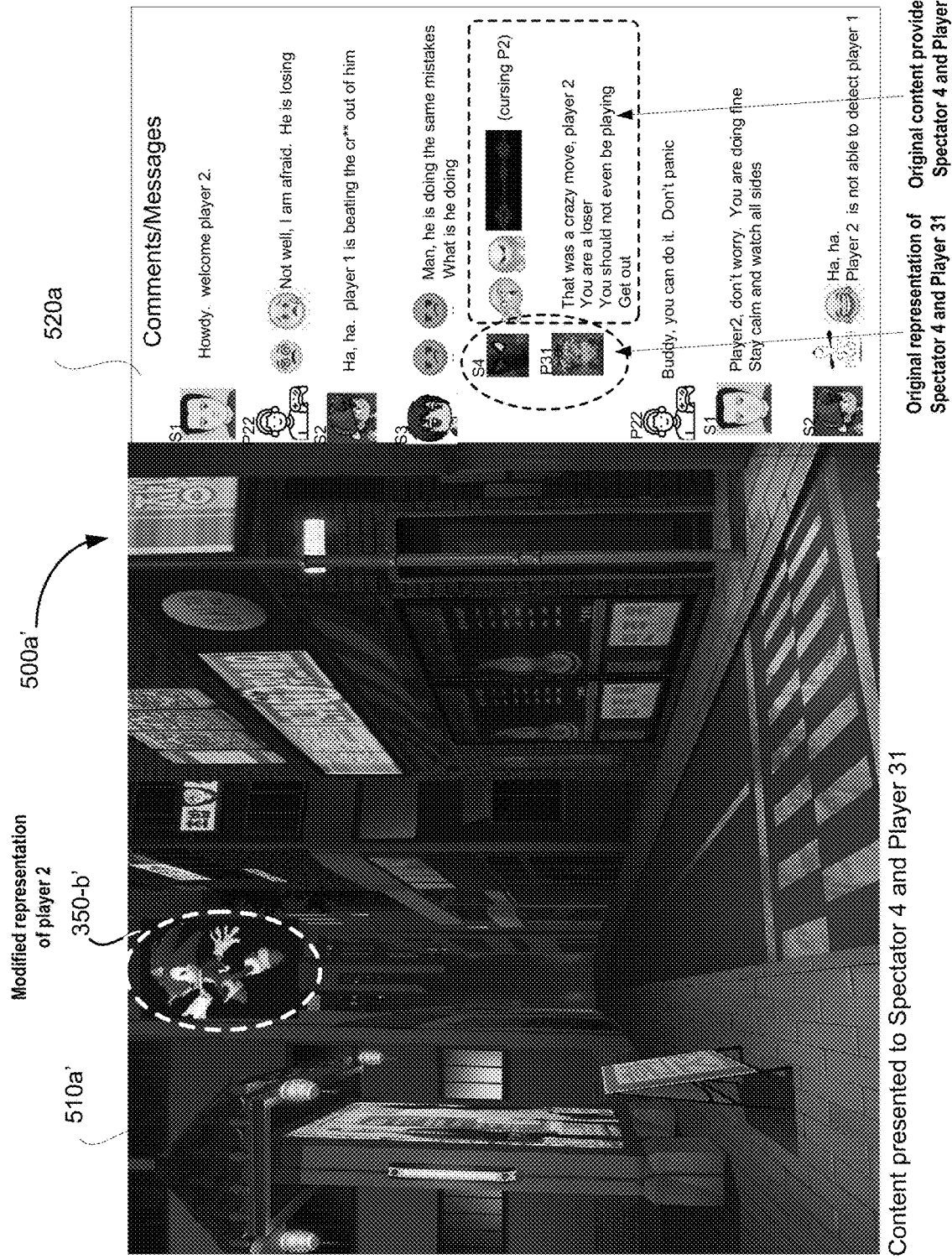

FIG. 6B illustrates modified content 500a' of the video game that includes a modified representation 350-b' of the second player. The modified representation 350-b' of the second player may be selected by the content modification engine randomly or may be defined or included in the user profile of the second player. The modified representation 350-b' is selected to hide the identity of the second player. The inputs provided via the interactive interface 520a that is included with the modified content 500a' remains the same as was shown in FIG. 6A and includes the original representations of all the users who have provided comments and the original comments provided by the users. This modified content 500a' hiding the identity of the second player is presented to spectator 4 and player 31, so as to prevent them from recognizing the second player in the gaming scenario 510a', and harassing or showering insults directed toward the second player.

Figure 6C:
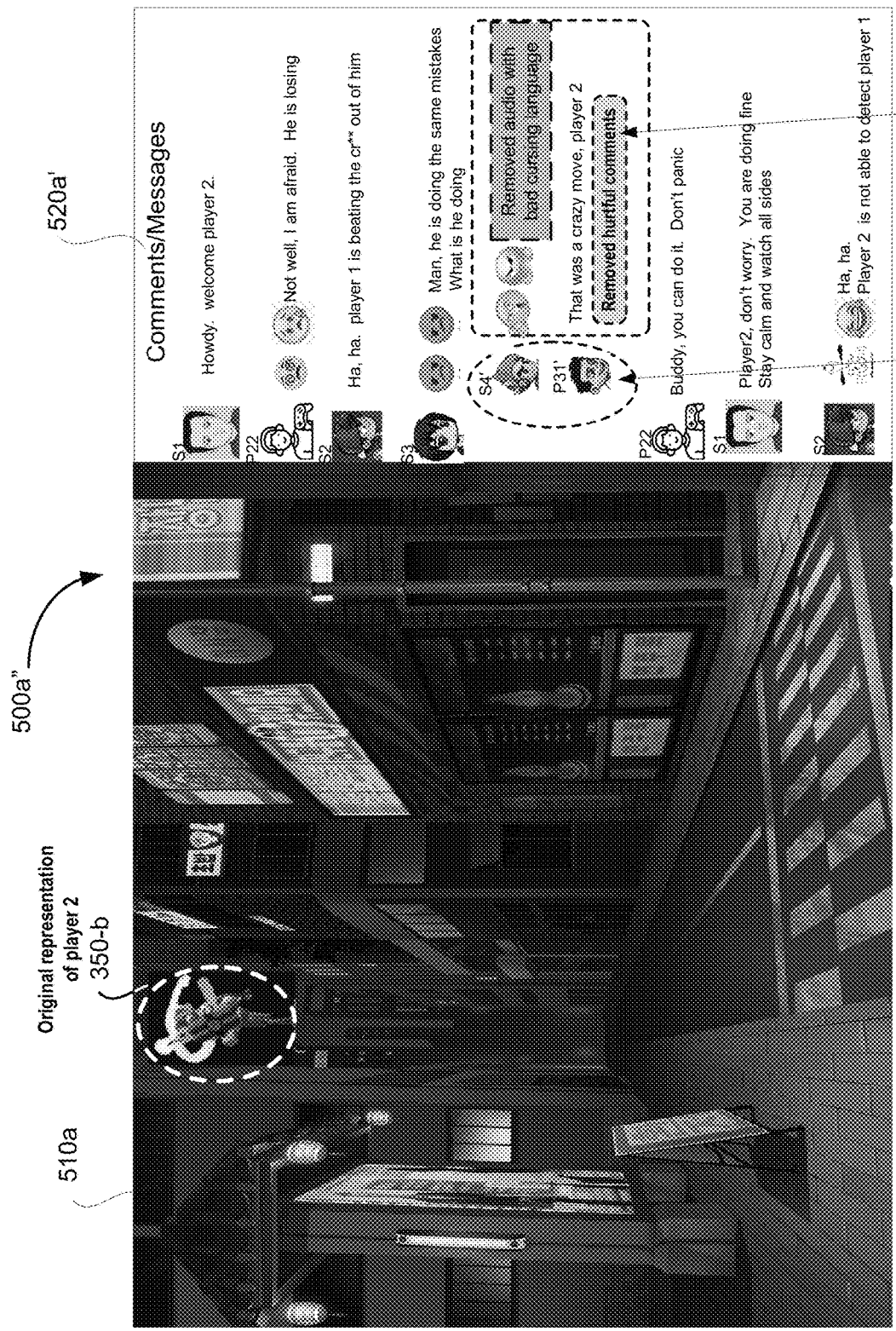

FIG. 6C illustrates modified content 500a" of the video game that is provided to the second player, in one alternate example. The modified content 500a" includes an original graphical representation 350-b of the second player in the gaming scenario 510a and a modified interactive interface 520a' that includes inputs provided by different users. The modified interactive interface 520a' includes modified inputs of spectator 4 and player 31, wherein the inputs are modified using a content filter that is defined for the second player. In addition to modifying the inputs of spectator 4 and player 31 to be in accordance to the preferences of the second player, the representation of spectator 4 and player 31 in the interactive interface 520a' are also modified from S4 and P31 to S4' and P31'. The modified representations of spectator 4 and player 31 in the interactive interface 520a' is to ensure that the identity of spectator 4 and player 31 are hidden so that the second player 350-b does not recognize their abuser and back away from using the video game.

Figure 6D:
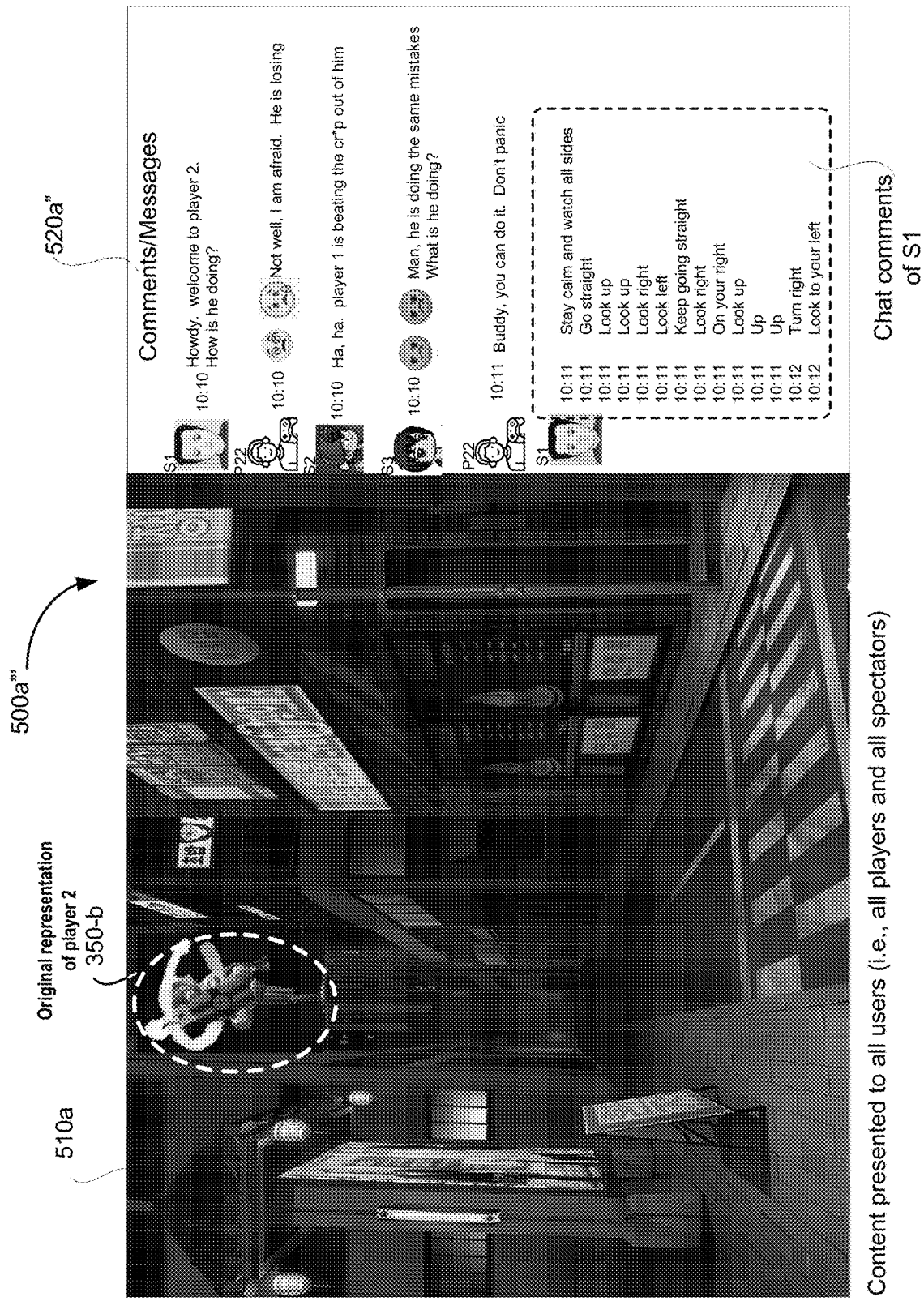

FIG. 6D illustrates content 500a''' of the video game, in another example, wherein the interactive interface 520a'' includes inputs from a plurality of users (e.g., players, spectators), wherein one of the user provides a number of inputs within a short duration that may exceed a predefined threshold volume 372. When the inputs from a user exceeds the predefined threshold volume 372, it usually means that the user is spamming (e.g., providing too many inputs to overwhelm the system, directing inputs toward another user (e.g., player or spectator) in order to overwhelm or intimidate the other user, etc. However, not all inputs provided by a user are inappropriate or try to intimidate a user. To determine a true intent of the user providing the burst of inputs, the content adjustment engine 400 contextually analyzes the inputs to determine if the inputs are relevant to the gaming scenario of the video game currently being rendered and if the inputs are appropriate or inappropriate. From the contextual analysis, it may appear that the burst of inputs provided by a user, spectator Si, was contextually relevant to the gaming scenario (e.g., a driving game scenario) and that the inputs were provided to assist the second player 350-b in the game play. Based on this determination, the inputs provided in the interactive interface 520" is left unmodified and the content 500a''' is presented with the gaming scenario 510a that incudes the original representation 350-b of the second user and the unmodified content from the interactive interface 520a" to all the users of the video game.

Figure 6E:
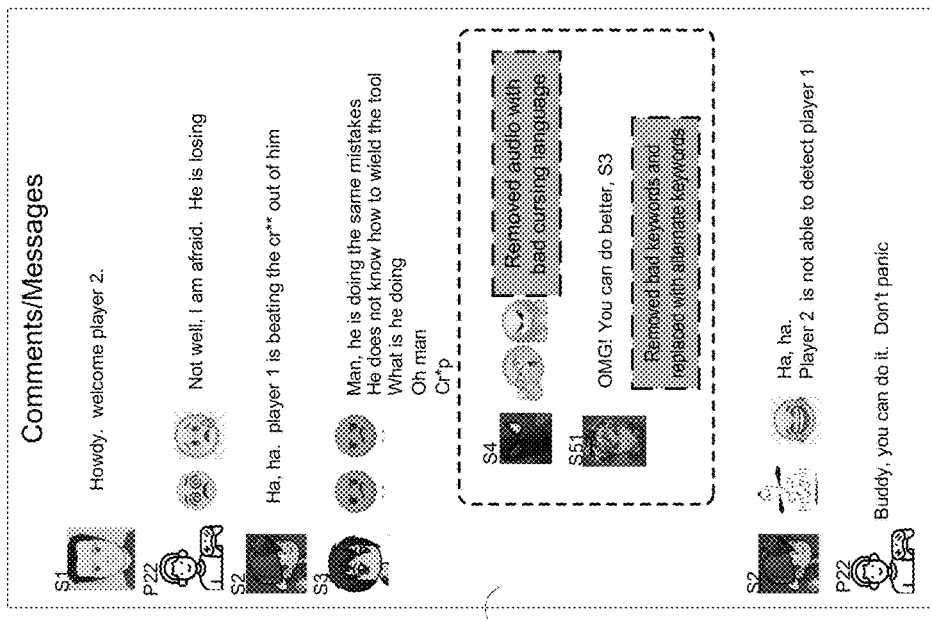

FIG. 6E illustrates an example interactive interface 520a''' rendered alongside gaming scenario (not shown) of the video game, with inputs from a plurality of users. The inputs may be of different types—text, audio, GIFs, memes, emojis, messages, videos, etc., and may include comments and other inputs related to the game play of the video game, related to a player or a player's game play in the video game, or related to a spectator or a spectator's comment, etc. In the example of FIG. 6E, spectators 4 and 51 have provided comments (i.e., audio and textual comments) directed toward spectator S3. The inputs may include inappropriate keywords that are unacceptable for the video game and are not in accordance to the rendering standards for spectator S3. In the example implementation of FIG. 6E, the unmodified interactive interface 520a''' is rendered with the gaming scenario for spectators S4 and S51.

Figure 6F:
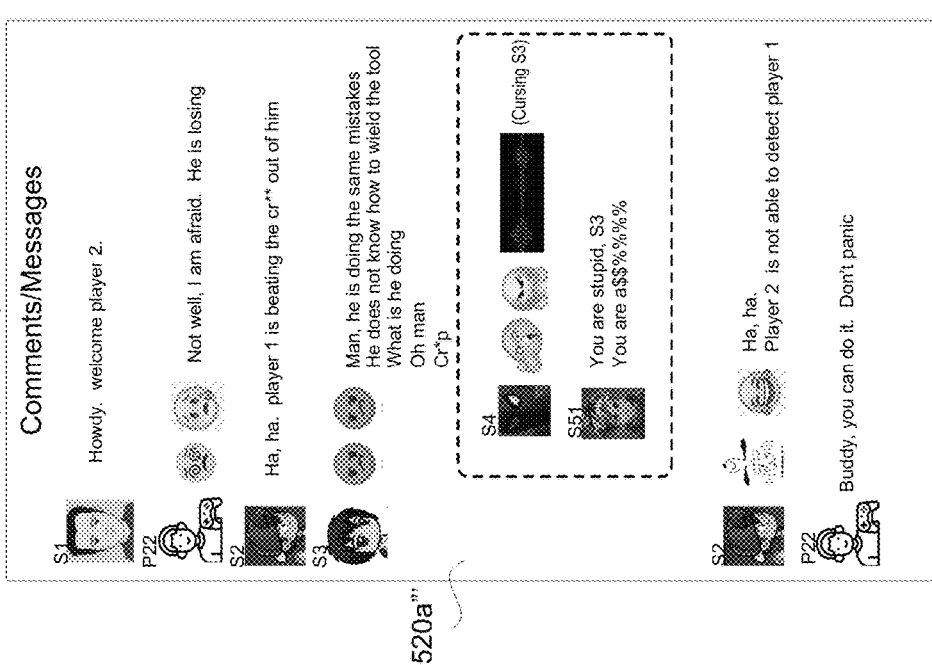

FIG. 6F illustrates an example modified interactive interface 520a'''' with inputs of spectators S4 and S51 modified to meet the rendering standard of spectator S3. As and when the inputs are provided via the interactive interface 520*a*"", the inputs are dynamically analyzed to determine the type of inputs and the quality of the inputs provided by the plurality of users during the current game play session. The type and quality of inputs may be specific to each user. Further, the analysis may be done to determine if the inputs are targeting a specific user (e.g., player or spectator) and if the inputs are helpful or hurtful in nature. The dynamic analysis is done by the content analysis engine 402 to ensure that the inputs provided to the respective user are in accordance to the rendering standards and preferences of other users of the video game. The results of the analysis are provided to the content modification engine 403 for further processing. Based on the analysis, it may be determined that the inputs provided by spectators S4 and S51 are targeting the spectator S3 and are inappropriate. Upon such determination, the content modification engine 403 dynamically filters the inputs of the spectators S4 and S51 included in the content presented to spectator S3 so as to replace certain ones of the keywords included in the inputs that are inappropriate for spectator S3 with alternate keywords that are acceptable or are in accordance to the rendering standard for spectator S3. The inappropriate keywords and appropriate keywords may be identified from a content filter identified for spectator S3. In some implementations, modifying the inputs may involve removing certain ones of the inputs that are not in accordance to the rendering standard of a user, from the interactive interface 520*a*"" presented to the user.

FIG. 6F shows one such example, wherein the audio content provided by spectator S4 containing inappropriate content (e.g., included cursing language) was removed and some of the textual comments of spectator S51 were modified by replacing the inappropriate keywords with alternate keywords that are acceptable to spectator S3. In the example shown in FIG. 6F, the text "You are stupid, S3" was replaced with "OMG! You can do better, S3". The replacement keywords for spectator S3 was identified using appropriate content filter defined for the video game, for the type of input and for the spectator S3. Additional comment provided by spectator S51 was removed as it did not comply with the rendering standard for spectator S3. The interactive interface 520*a*"" with the modified inputs is provided with the gaming scenario of the video game to spectator S3.

The various implementations discussed herein are used to modify content related to the video game and to modify the game mechanics of the video game to recognize the modified content of the video game, so that either the modified content or original content may be presented to the different users. The modification is done to hide identity of an abusee' so as to deter abusive activity of an abuser toward the abusee'. The content modification also includes modifying chat content from a first user so that the chat content does not include keywords that are inappropriate for a second user. Additional, the volume of chat may also be controlled by throttling down the volume of chat, if the chat is not contextually relevant to the game play of the video game so that the volume does not exceed the predefined threshold volume 372. The content is filtered for each individual user prior to providing the filtered content to the respective user. The content adjustment engine 400 may be part of the video game or referred to by the video game. In one implementation, the video game is a Open World massively multi-player online role-playing video game (Open World MMORPG), wherein changing appearance (i.e., representation) of a player does not affect the other players. In the MMORPG type of games, the game story is broken down into a series of missions and the players' inputs are used to drive the goal of achieving each mission. The behavioral analysis of each user using inputs of the respective user from prior game play sessions and the contextual analysis of the content from the current game play session assist in determining the behavior of each user toward other user so that appropriate content filters can be identified and the content modified prior to presenting the content to each user.

In addition to determining behavior of each user from prior game play sessions, other metrics, such as in-game voting system, may be used to further validate the behavior of each user. A user may behave nicely in one game but may behave badly toward to one or more other users in another game. The good behavior as well as the bad behavior of the user from the different games are considered to determine the overall behavior of the user and used to adjust content of the video game.

Figure 7:
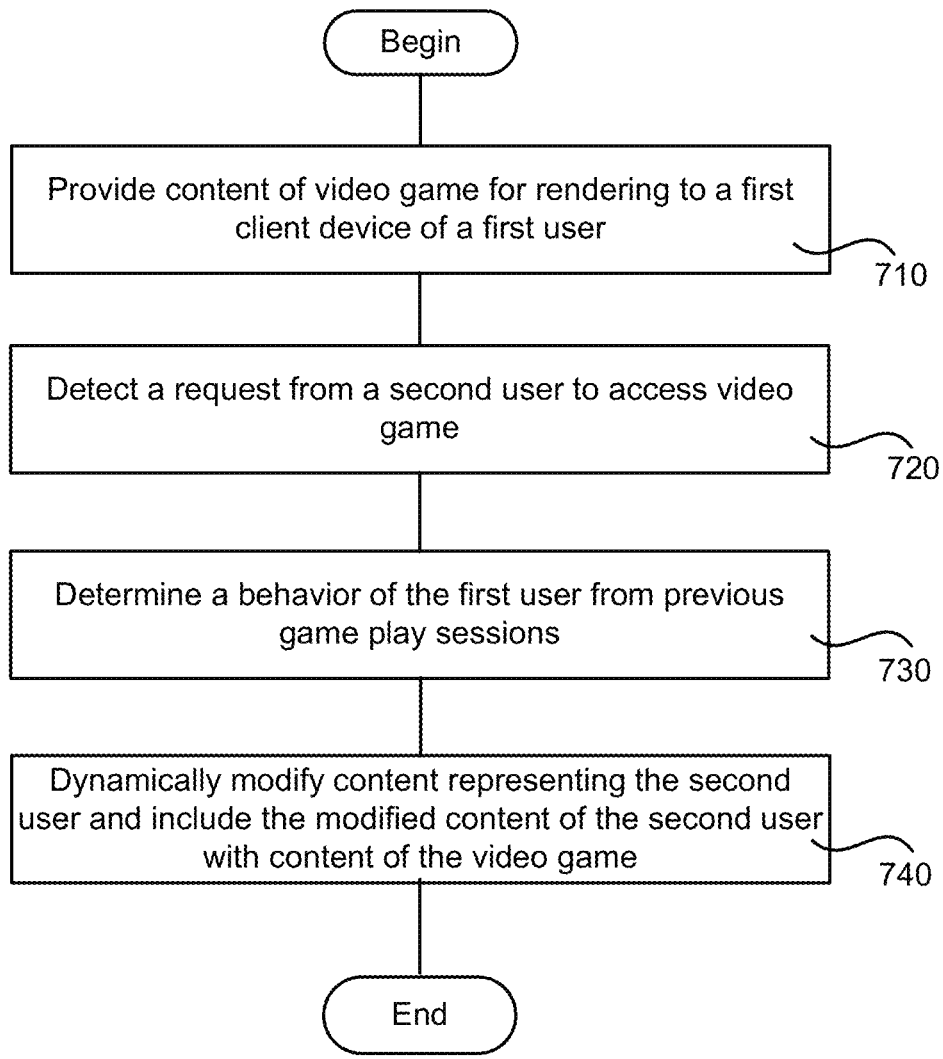
FIG. 7 illustrates flow operations of a method for modifying game related content of a video game based on analysis of input of a user, in accordance with one example implementation of the present disclosure.

FIG. 7 illustrates flow of operations of a method for modifying content of a video game, in one implementation. The method begins at operation 710, wherein content of the video game is provided for rendering on a first client device of a first user. The content may be provided upon detecting a request from the first user to access the video game during a current game play session. The first user may be a player or a spectator. The content of the video game includes game play data used to generate a gaming scenario of the video game and inputs provided via interactive interface. The content is rendered after successfully authenticating the first user.

A request from a second user to access the video game is detected, as shown in operation 720. The second user may be a player or a spectator and the access request may be for game play or for viewing game play of the video game. The second user is authenticated in a manner similar to that of authenticating the first user. Upon successful authentication, the content adjustment engine 400 determines other users that are already present in the video game, wherein the other users may be players or spectators. The content adjustment engine 400 may determine that the video game already includes the first user. Upon detecting presence of other users (e.g., at least the first user, in one example implementation) in the video game, the content adjustment engine 400 may dynamically determine behavior of each of the other users present in the video game, as illustrated in operation 730. The behavior of each of the other users (i.e., at least the first user) may be determined by analyzing inputs of the respective other users provided during prior game play sessions. The prior game play sessions may be from the same video game of the current game play session, or may be from the current video game and other video games in which the other users and the second user participated. The analysis of the inputs of the first user in the prior game play sessions may show that the first user was abusive toward the second user.

In response to the access request from the second user and upon detecting the abusive behavior of the first user toward the second user, a representation of the second user is modified to hide the identity of the second user, as illustrated in operation 740. The modified representation of the second user is included with content of the video game provided to a client device of the first user for rendering. The original representation of the second user is provided with the content of the video game to the second user.

In some implementations, the representation of the first user may also be modified and the modified representation of the first user included with the content forwarded to the second user. The modified representation of the second user is to prevent the first user from identifying the second user and deter the first user from abusing the second user. The modified representation of the first user may be to prevent the second user from shying away from the video game and to encourage the second user to access the video game for viewing and/or playing.

Game developers and game hosts want to improve the entertainment value of the video game and to keep the users engaged in the video game for extended periods of time. More users may be attracted to the video game if the video game ensures that the users can have pleasant experience while having interesting experience. The various implementations described herein provided such experience by hiding the identity of the users in the content so as to prevent the users from identifying and abusing other users. The machine learning employs various analysis tools and metrics to properly identify the behavior of each user. When a certain user's behavior is determined to be bad, the content adjustment engine 400 proactively modifies representation of specific other users included with the content of the video game to the certain user whose behavior is bad, so as to deter the certain user from continuing their bad behavior. Warning signals and/or messages requesting the certain user to correct their behavior may also be provided with the content that is targeted to the certain user.

Figure 8:
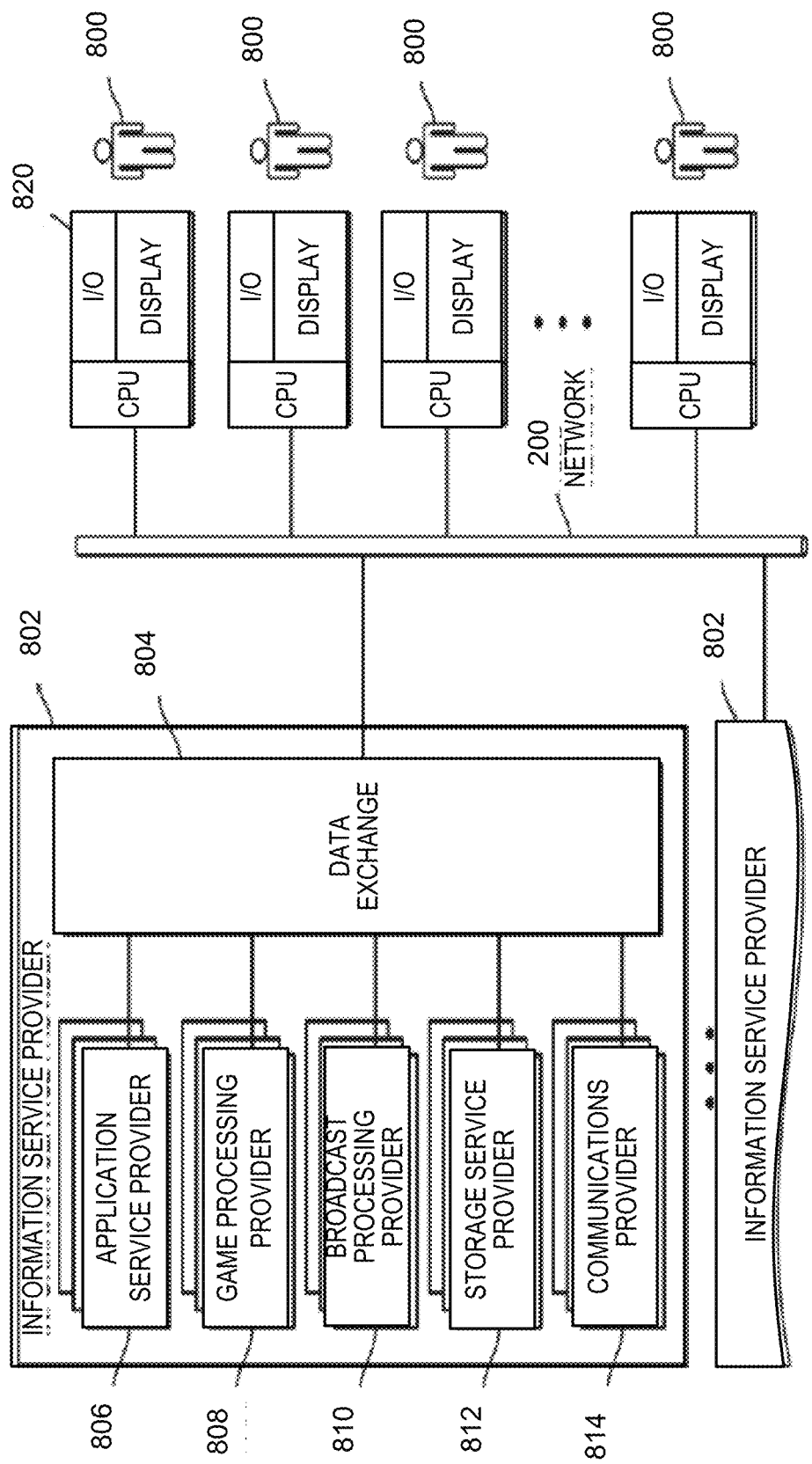
FIG. 8 illustrates an example implementation of an Information Service Provider architecture, in accordance with one implementation of the present disclosure.

FIG. 8 illustrates an embodiment of an Information Service Provider architecture. Information Service Providers (ISP) 802 delivers a multitude of information services to users (i.e., players) 800 geographically dispersed and connected via network 200. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 802 includes Application Service Provider (ASP) 806, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 802 includes a Game Processing Server (GPS) 808 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 810 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 812 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 814 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 804 interconnects the several modules inside ISP 802 and connects these modules to users 800 via network 200. Data Exchange 804 can cover a small area where all the modules of ISP 802 are in close proximity, or can cover a large geographic area when the different modules are geographically dispersed. For example, Data Exchange 804 can include a fast Gigabit Ethernet (or faster) within a cabinet of a data center, or an intercontinental virtual area network (VLAN).

Users 800 access the remote services with client device 820 (i.e., client device 100 in FIG. 1), which includes at least a CPU, a memory, a display and I/O. The client device can be a PC, a mobile phone, a netbook, tablet, gaming system, a PDA, etc. In one embodiment, ISP 802 recognizes the type of device used by the client and adjusts the communication method employed. In other cases, client devices use a standard communications method, such as html, to access ISP 802.

Figure 9:
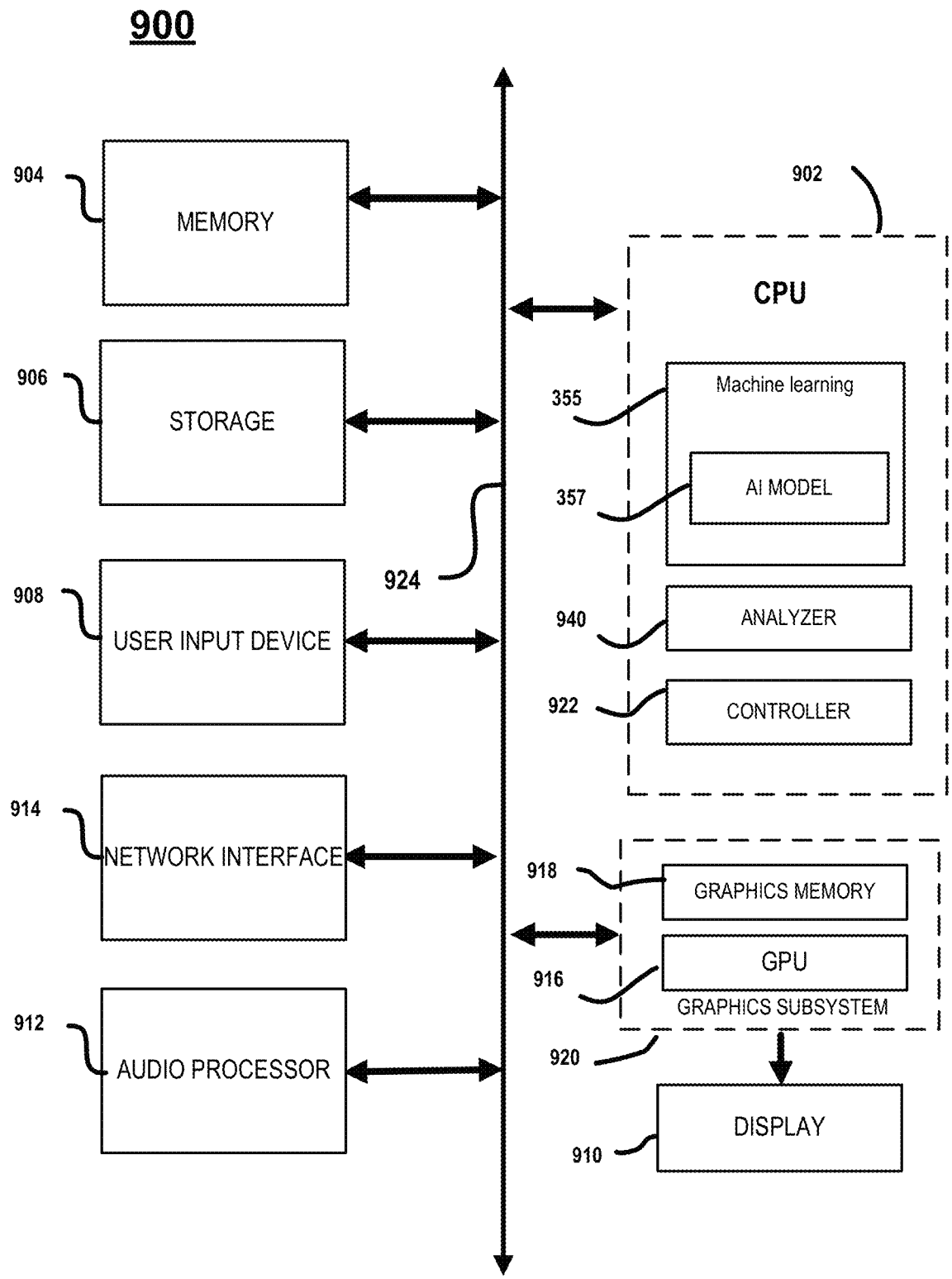
FIG. 9 illustrates a simplified block diagram of a game cloud server used for determining behavior of each player in a video game, in accordance with one implementation of the present disclosure.

FIG. 9 illustrates components of an example computing device 900 that can be used to perform aspects of the various embodiments of the present disclosure. This block diagram illustrates a computing device 900 that can incorporate or can be a personal computer, video game console, personal digital assistant, a server 302 or other digital device, suitable for practicing an embodiment of the disclosure. FIG. 9 illustrates an exemplary device with hardware components suitable for training an AI model that is capable of performing various functionalities in relation to a video game and/or game plays of the video game, in accordance with one embodiment of the present disclosure. Computing device 900 includes a central processing unit (CPU) 902 for running software applications and optionally an operating system. CPU 902 may be comprised of one or more homogeneous or heterogeneous processing cores. For example, CPU 902 is one or more general-purpose microprocessors having one or more processing cores. Further embodiments can be implemented using one or more CPUs 902 with microprocessor architectures specifically adapted for highly parallel and computationally intensive applications, such as processing operations of interpreting a query, identifying contextually relevant resources, implementing and rendering the contextually relevant resources in a video game immediately, media and interactive entertainment applications, applications configured for deep learning, content classification, and user classifications. For example, CPU 902 may be configured to include the content adjustment engine 400, which includes a machine learning algorithm (also referred to herein as AI engine or deep learning engine) 355 that is configured to support and/or perform learning operations with regards to providing various functionalities (e.g., predicting, suggesting) in relation to a video game and/or game plays of the video game. Further, the CPU 902 includes an analyzer 940 that is configured for analyzing the inputs and interactions of the users (i.e., players, spectators, influencers) and providing the results of the analysis for generating and training a behavior model (AI model) 357. The trained behavior model 357 provides an output in response to a particular set of players' inputs, wherein the output is dependent on the predefined functionality of the trained behavior model 357. The trained behavior model 357 may be used to identify a behavior output that can be used to modify content related to a first user, and provide the modified content related to the first user to a second user. The modification to the content is to hide the identity of the first user so that the second user is not able to recognize the first user in the content of the video game.

Computing device 900 may be localized to a player playing a game segment (e.g., game console), or remote from the player (e.g., back-end server processor), or one of many servers using virtualization in a game cloud system for remote streaming of gameplay to client devices (or simply referred to as "clients").

Memory 904 stores applications and data for use by the CPU 902. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to computing device 900, examples of which may include keyboards, mice, joysticks, touch pads, touch screens, handheld controllers, wearable controllers, still or video recorders/cameras, tracking devices for recognizing gestures, and/or microphones. Network interface 914 allows computing device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of computing device 900, including CPU 902, memory 904, data storage 906, user input devices 908, network interface 914, and audio processor 912 are connected via one or more data buses 924.

A graphics subsystem 920 is further connected with data bus 924 and the components of the computing device 900. The graphics subsystem 920 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 916, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 920 periodically outputs pixel data for an image from graphics memory 918 to be displayed on display device 910. Display device 910 can be any device capable of displaying visual information in response to a signal from the device 800, including CRT, LCD, plasma, and OLED displays. Computing device 900 can provide the display device 910 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure of the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server 302 may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of PEs, each of which may reside on different server units of a data center.

According to this embodiment, the respective PEs for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a PE associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, a mobile device, etc. In one embodiment, the network executing on the game server recognizes the type of client device used by a user and adjusts the communication method employed. In other cases, client devices use a standard communications method, such as html, to access the application on the game server over the internet.

It should be appreciated that a given video game or gaming application may be developed for a specific platform and a specific associated controller device (or simply referred to as "controller") 922. However, when such a game is made available via a game cloud system as presented herein, the user (e.g., player) may be accessing the video game with a different controller 922. For example, a game might have been developed for a game console and its associated controller 922, whereas the user might be accessing a cloud-based version of the game from a personal computer utilizing a keyboard and mouse. In such a scenario, the input parameter configuration can define a mapping from inputs which can be generated by the user's available controller 922 (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller 922 are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller 922. That is, the controller 922 communicates via a wireless or wired connection with the client device to transmit inputs from the controller 922 to the client device. The client device may in turn process these inputs and then transmit input data to the game cloud server via a network (e.g. accessed via a local networking device such as a router). However, in other embodiments, the controller 922 can itself be a networked device, with the ability to communicate inputs directly via the network to the game cloud server, without being required to communicate such inputs through the client device first. For example, the controller 922 might connect to a local networking device (such as the aforementioned router) to send to and receive data from the game cloud server. Thus, while the client device may still be required to receive video output from the cloud-based video game and render it on a local display, input latency can be reduced by allowing the controller 922 to send inputs directly over the network to the game cloud server, bypassing the client device.

In one embodiment, a networked controller 922 and client device can be configured to send certain types of inputs directly from the controller 922 to the game cloud server, and other types of inputs via the client device. For example, inputs whose detection does not depend on any additional hardware or processing apart from the controller 922 itself can be sent directly from the controller 922 to the game cloud server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game cloud server. These might include captured video or audio from the game environment that may be processed by the client device before sending to the game cloud server. Additionally, inputs from motion detection hardware of the controller 922 might be processed by the client device in conjunction with captured video to detect the position and motion of the controller 922, which would subsequently be communicated by the client device to the game cloud server. It should be appreciated that the controller 922 in accordance with various embodiments may also receive data (e.g. feedback data) from the client device or directly from the game cloud server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for adjusting content of a video game, comprising:
   providing content of the video game from a current game play session for rendering on a client device of a first user, in response to the first user accessing the video game during the current game play session;

detecting a request from a second user to access the video game for the current game play session accessed by the first user;

responsive to detecting the request from the second user, determining a behavior of the first user toward the second user by analyzing input of the first user from one or more previous game play sessions of the video game; and when the behavior of the first user is determined to be abusive toward the second user, dynamically modifying an original representation of the second user to generate a modified representation, the modified representation of the second user included in the content of the video game forwarded to the client device of the first user for rendering and the original representation of the second user included with content forwarded to a second client device of the second user, wherein the modified representation of the second user hides an identity of the second user in the content provided to the first user during the current game play session.

2. The method of claim 1, wherein the modified representation of the second user inherits select ones of user attributes associated with the original representation of the second user, the select ones of the user attributes inherited are relevant to mimic a behavior of the original representation of the second user within a gaming scenario of the video game, wherein the select ones of the user attributes includes at least physics attributes pertaining to game play of the video game.

3. The method of claim 1, wherein modifying the original representation includes, identifying an alternate game character and an alternate user identifier for associating with the second user, wherein the alternate game character and the alternate user identifier being specific to the second user and is in addition to an original game character and an original user identifier associated with the original representation of the second user;

including the alternate game character of the second user within gaming scenario of the video game forwarded with the content to the client device of the first user, the alternate game character associated with the alternate user identifier in the video game; and including the original game character of the second user within gaming scenario of the video game forwarded with the content to a client device of the second user, the original game character is associated with the original user identifier of the second user and reveals an identity of the second user.

4. The method of claim 3, wherein the alternate game character and the alternate user identifier of the second user are included in content of the video game forwarded to client devices of a first set of other users who are affiliated with the first user, and wherein the original game character and the original user identifier of the second user are included with content of the video game forwarded to client devices of a second set of other users of the video game who are affiliated with the second user, wherein each of the other users in the first set and the second set of other users are any one of spectators and players of the video game, and are different from the first user and the second user.

5. The method of claim 1, wherein modifying the original representation further includes modifying at least an original graphic representation and an original user identifier of the second user to generate modified graphic representation and modified user identifier for the second user, wherein the modified graphic representation and the modified user identifier are associated with the second user and are configured to hide the identity of the second user, and wherein the original graphic representation and the original user identifier reveal the identity of the second user.

6. The method of claim 1, wherein modifying content further includes modifying game mechanics of the video game to generate modified game mechanics, the modified game mechanics configured to recognize the modified representation of the second user, such that game inputs provided by the second user during game play are processed by the modified game mechanics to generate the content for the video game, the generated content for the video game forwarded with the modified representation of the second user to the client device of the first user for rendering.

7. The method of claim 1, wherein the first user and the second user are players of the video game.

8. The method of claim 1, wherein the first user is a spectator and the second user is a player.

9. The method of claim 1, wherein the first user and the second user are spectators.

10. The method of claim 1, further includes modifying representation of the first user included with the content of the video game forwarded to the second user, wherein modifying representation of the first user includes generating a modified game character of the first user and including the modified game character of the first user with content of the video game forwarded to a client device of the second user, the modified game character of the first user masking an identity of the first user to the second user.

11. The method of claim 1, wherein the content related to the video game provided to the first user and the second user during the current game play session includes gaming scenario of the video game and content included in an interactive interface that is presented alongside the gaming scenario, the content included in the interactive interface is generated from input of users including the first user and the second user, wherein the content generated within the interactive interface from input of the users include video content, textual content, graphic content, chat content, audio content or any combinations thereof, wherein the input of the first user in the current game play session includes input within the gaming scenario of the video game, or input used to generate the content within the interactive interface, wherein analyzing the input of the first user includes performing contextual analysis of the input, and wherein the first user is one of a player, or a spectator or an influencer.

12. The method of claim 11, further includes receiving input of the first user during the current game play session, wherein when the input of the first user in the current game play session is one of audio content or text content or chat content, dynamically filtering the audio content or text content or chat content using a content filter identified for the second user to generate modified content, the dynamic filtering includes replacing a certain keyword included in the audio content, text content or chat content that is perceived as offensive or inappropriate for the second user with a different keyword that is appropriate for the second user, wherein the different keyword selected being specific for the second user and identified using the identified content filter.

13. The method of claim 12, wherein the audio content, or the text content, or the chat content without the dynamic filtering is provided for rendering on the client device of the first user, and the modified content resulting from the dynamic filtering is provided for rendering on a second client device associated with the second user.

14. The method of claim 12, wherein the content filter for filtering is selected from a plurality of content filters, the plurality of content filters provided on a selection interface with options for selecting and de-selecting, the plurality of content filters included in the selection interface is specific for the video game and for the second user.

15. The method of claim 12, wherein when the input of the first user includes chat content, modifying content includes dynamically throttling a volume of chat content generated by the first user during the current game play session, upon detecting the volume of chat content exceeds a predefined threshold volume, wherein the predefined threshold volume is defined for the video game and is specified for each user generating the chat content.

16. The method of claim 15, wherein the dynamic throttling of the volume is performed based on context of the video game and a user profile of the first user.

17. The method of claim 1, wherein when input of the first user received during the current game play session includes audio content, text content, or chat content, modifying content includes translating the audio content, text content or chat content from a first language to a second language preferred by the second user, the second language identified from preferences defined in a user profile of the second user, and
wherein the translating further includes dynamically filtering the input translated to the second language using a content filter, the dynamic filtering is done to replace one or more keywords included in the input translated into the second language with alternate keywords that are found to be appropriate for the second user, the modified content with the translation and including dynamic filtering presented at a client device of the second user, and the content in the first language is presented at the client device of the first user.

18. The method of claim 17, wherein the content filter is identified from a plurality of content filters, based on user preferences defined in a user profile of the second user, and is specific for the video game and for the second language.

19. The method of claim 1, wherein the content including the representation of the second user includes any one or combination of a graphical representation of the second user, or a user identifier, or content provided via an interactive interface, and wherein modifying content includes modifying one or more of the graphical representation of the second user, or the user identifier or the content provided via the interactive interface.

20. The method of claim 1, wherein the second user is a player of the video game, and the modified representation of the second user is presented within the gaming scenario of the video game rendered on the client device of the first user.

21. The method of claim 1, wherein the second user is a spectator of the video game, and the modified representation of the second user is presented within an interactive interface provided alongside a gaming scenario of the video game on the client device of the first user, the interactive interface used for receiving and presenting any one or combination of audio content, or video content, or graphic content, or chat content or text content related to the video game.

22. The method of claim 1, wherein the behavior of the first user is determined by building and training a behavior model for the first user using the input provided by the first user during one or more previous game play sessions, game objectives of the video game, input provided by one or more other users during the one or more previous game play sessions of the video game, and feedback from the one or more other users, wherein the behavior model is built and trained using machine learning.

23. A method for adjusting content of a video game, comprising:
receiving input from a first user during game play of the video game in a current game play session, the game play generating game content for rendering on client devices of the first user and a second user, the input from the first user interpreted to generate the content of the video game, wherein the content of the video game includes the game content and interactive interface content rendered alongside the game content, the interactive interface content generated from select input provided by one or more users, wherein the one or more users includes at least the first user and the second user;
analyzing the input of the first user in accordance to game context of the video game to determine if the input of the first user is targeting the second user and is abusive in nature;
modifying a graphic representation of the second user included in the content of the video game to generate a modified graphic representation of the second user, and including the modified graphic representation of the second user with the content of the video game provided to the client device of the first user for rendering and including the graphic representation of the second user with the content of the video game provided to the client device of the second user for rendering;
modifying the input of the first user targeting the second user to generate a modified input, when the input of the first user is determined to be abusive toward the second user, the modified input generated by filtering the input using a content filter identified for the second user; and
providing the content of the video game to the client devices of the first user and the second user for rendering, the content of the video game forwarded to the first user including the input of the first user and the content forwarded to the second user including the modified input generated by filtering the input of the first user.

24. The method of claim 23, wherein the content of the video game provided to the first user includes the input of the first user provided during the game play of the video game.

25. The method of claim 23, wherein the input of the first user includes input content, and wherein modifying the input includes modifying the input content, in accordance to rendering standards of the second user, to generate the modified input.

26. The method of claim 23, wherein the input of the first user includes input content, the input is associated with at least a graphic representation and a user identifier of the first user, and
wherein modifying the input includes modifying the input content, the graphic representation and the user identifier of the first user to generate the modified input, the modifying done in accordance to rendering standards of the second user.

27. The method of claim 23, wherein the modified graphic representation of the second user is selected to hide an identity of the second user, the content of the video game including input of the first user.

28. The method of claim 27, wherein the graphic representation of the second user included with the content of the video game presented to the second user revealing the identity of the second user.

29. The method of claim 27, wherein modifying the input further includes modifying game mechanics of the video game to allow the game mechanics to recognize the modified graphic representation of the second user, the modified input and the input of the first user, such that the modified input with the graphic representation of the second user is provided with the content of the video game to the second user during game play, and the input without modification and the modified graphic representation of the second user is provided with the content of the video game to the first user.

30. The method of claim 23, wherein the video game is a multi-player video game with the first user affiliated with a first team and the second user affiliated with a second team, and wherein the content of the video game with the modified input of the first user is presented to users affiliated with the second team and the content of the video game with the input of the first user is presented to users affiliated with the first team.

\* \* \* \* \*